(12) United States Patent
Fushimi et al.

(10) Patent No.: US 6,172,978 B1
(45) Date of Patent: Jan. 9, 2001

(54) TANDEM RELAY DEVICE

(75) Inventors: Wataru Fushimi; Yoshihiko Shirokura; Yukimasa Sugino; Hideaki Ebisawa; Yushi Naito, all of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 08/982,505

(22) Filed: Dec. 2, 1997

(30) Foreign Application Priority Data

Dec. 20, 1996 (JP) ...................................................... 8-341628

(51) Int. Cl.[7] .............................. H04L 12/66; H04L 12/28
(52) U.S. Cl. .......................... 370/395; 370/352; 370/353; 370/354
(58) Field of Search .................................... 370/352, 353, 370/354, 395, 474, 476; 455/115

(56) References Cited

U.S. PATENT DOCUMENTS 5,477,542   12/1995   Takahara et al. .
5,881,373 * 3/1999   Elofsson et al. ...................... 455/115
5,926,477 * 7/1999   Shirokura et al. .................... 370/395

\* cited by examiner

*Primary Examiner*—Chi H. Pham
*Assistant Examiner*—Brenda H. Pham

(57) ABSTRACT

In establishing an audio one link connection wherein an audio signal is not encoded/decoded in a relay station, loud noises may be produced if the states of two audio tandem relay devices which make a pair during relay are changed from a normal connection state to a relay connection state at different times. In order to solve this problem, comfort noise generators are provided. In detail, when a first pattern signal is detected while a relay call is connected via a relay exchange, switches are switched to be connected at a contact point 1, and a switch is at a contact point 2. Upon detection of a second pattern signal, the switches are connected at the contact points 2, while the switches are connected at the contact points 2. With this arrangement, outputs from the comfort noise generators are selected and outputted during a period from first pattern signal detection to second pattern signal detection, during which the states of the two devices of a pair are different. As a result, occurrence of loud noises is prevented.

15 Claims, 15 Drawing Sheets

TANDEM RELAY DEVICE

BACKGROUND OF THE INVENTION

1. Field of the Invention

The present invention relates to an audio tandem relay device for transmitting and exchanging an audio signal in a communication system which employs synchronous transfer mode (STM) and an asynchronous transfer mode (ATM).

2. Description of the Prior Art

FIG. 1 is a block diagram showing the structure of a conventional audio tandem relay device. In this structure, a cell disassembly 1 disassembles an ATM cell inputted from a line into an encoded audio signal; an audio decoder 2 decodes an encoded audio signal into an audio signal; an audio encoder 3 encodes an audio signal inputted from an exchange side into an encoded audio signal; a cell assembly 4 assembles an ATM cell from an inputted encoded audio signal, etc.; a pseudo 64k signal composer 5a generates a pseudo encoded audio signal of 64 kbit/s (a pseudo audio signal) by converting, without decoding, an encoded audio signal of 32 kbit/s or 16 kbit/s, etc., the pseudo audio signal maintaining the same data rate as that before the conversion and being usable by a relay exchange; a pseudo 64k signal decomposer 6a changes a pseudo 64k signal inputted from an exchange side into an encoded audio signal having the original data rate; a first pattern inserter 10 inserts a first pattern signal so that an audio tandem relay device which makes a pair with its own audio tandem relay device in relaying (a paired audio tandem relay device or a paired device) will acknowledge that the current signal transmission is a relay transmission; a second pattern inserter 11 inserts a second pattern signal so that a paired device will acknowledge that its own device is in a relay exchange state after detection of a first pattern signal; a first/second pattern detector 12 detects either a first or second pattern signal inserted by a paired device; a second switch 20 switches its connection from a contact point 2 to a contact point 1 upon detection of either a first or second pattern signal in a signal inputted from an exchange side, to thereby output a signal from a pseudo 64k decomposer 6a in place of that from an audio encoder; and a first switch 21 switches its connection upon detection of either a first or second pattern signal in a signal inputted from an exchange side, to thereby output a signal from the second pattern inserter 11 in place of that from the first pattern inserter 10.

An operation will next be described based on the accompanying drawings. FIG. 1 shows an audio tandem relay device in the initial state, in which first and second switches 20, 21 are connected at contact points 2. When a telephone makes a call, an exchange to which the phone is connected outputs a Pulse Code Modulation (PCM) audio signal of 64 kbit/s into an audio tandem relay device connected thereto. As this signal includes neither a first nor a second pattern signal, a first/second pattern detector 12 in that device detects neither pattern signal, and the state of the switches of the device thus remain in the same state. The signal which was then supplied to the audio encoder 3 is encoded into an encoded audio signal, and passes through a second switch 20, proceeding to the cell assembly 4, so that the cell assembly 4 assembles a cell out of the signal supplied and outputs the cell to the line side.

When this cell arrives at a station which happens to be a called station for that call, the cell is disassembled by the cell disassembly 1 into an encoded audio signal. The resulting signal which was then inputted into the audio decoder 2 is decoded into a PCM audio signal therein, and subsequently given a first pattern signal in a first pattern inserter 10 before being outputted via a switch 21 to the exchange side. The signal is further transmitted to the telephone addressed by the call, which is connected to that exchange.

Also, when the cell arrives at a relay station, the arriving cell is processed similarly to the above in an audio tandem relay device of that station. This device, i.e., a relay device, is connected to another audio tandem relay device via an exchange, and these two devices make a pair in relaying, each hereinafter being referred to as a paired audio tandem relay device or a paired device. In the paired device, after it has received a signal from its exchange side, a first/second pattern detector 12 detects a first pattern signal in the signal received, upon which switches 20, 21 are switched so as to be connected at contact points 1. As a result, an output from the pseudo 64k signal decomposer 6a passes through the switch 20 and proceeds to the cell assembly 4, while an output of the pseudo 64k signal composer 5a passes through the switch 21 after being given a second pattern signal by the second pattern signal inserter 11, and is outputted to the exchange side. Note that a signal in the opposite direction in a telephone communication, which is a bidirectional communication, is similarly processed.

As described above, an audio signal is neither encoded nor decoded in a relay station, where composition or decomposition of a pseudo 64k signal is performed instead. In other words, an audio signal is encoded or decoded only in calling and called stations. With this arrangement, degradation of audio quality due to repetition of encoding/decoding can be effectively prevented.

FIG. 2 is a block diagram showing the structure of a conventional audio compression converter disclosed in JP laid-open No. Hei 7-307706, and so on. This structure comprises a silent data generator 30; a separator 31 for separating an audio signal (or an encoded audio signal) and a relay frame signal, both supplied from the exchange side; a multiplexer 32 for inserting a relay frame signal into an audio signal (or an encoded audio signal); an audio encoder 33 for encoding an audio signal; an audio decoder 34 for decoding an encoded audio signal inputted; selectors 35, 36; a relay frame detector 37 for detecting a relay frame signal which has been separated by the separator 31; a relay frame inserter 38 for inserting a relay frame signal; and a timer 39.

The operation will next be described based on the accompanying drawings. In normal call connection, the selectors 35, 36 select outputs from the audio encoder 33 and the audio decoder 34, respectively. With this, an audio signal supplied from the exchange side is encoded by the audio encoder 33 and outputted as an encoded audio signal to the line side, while an encoded audio signal from the line side is decoded by the audio encoder 34 and multiplexed with a relay frame signal by the multiplexer 32 before being outputted to the exchange side.

In relay call connection, on the other hand, the relay frame detector 37 detects a relay frame signal, upon which the selector 35 is switched so as to select silent data for output from the silent data generator 30. A predetermined period of time after the detection, the timer 39 switches the selectors 35, 36 such that they select and output signals which have bypassed the audio encoder 33 and the audio decoder 34, respectively. With this arrangement, an audio signal is not encoded or decoded in a relay station, and is only encoded or decoded in calling and called stations. This can prevent degradation of audio quality due to repetition of audio encoding/decoding.

However, a conventional audio tandem relay device shown in FIG. 1 has such a problem that callers may sometimes hear loud noises. To be specific, in relay connection where one audio tandem relay device of a pair detects either a first or second pattern signal later or earlier than the other, loud noises may be produced and heard by the caller. This happens because one device of a pair will stay in a relay connection state in which the first and second switches 21, 20 remain connected at the contact points 1 until both detect either a first or a second pattern signal, whereas the other is then in a calling state in which they are connected at the contact points 2. In short, the difference in detection timing for first and second pattern signals between the two devices will hinder uniform changing of the states of these devices. This results in the aforementioned problem of loud noises.

Also, in a conventional audio compression converter, if relay frame signals are detected at different timings by a pair of such converters in relay connection, decoded audio data is outputted to a caller without being encoded by its pair converter. This also causes a problem of loud noises.

SUMMARY OF THE INVENTION

The present invention has been conceived to overcome the above problems, and aims to provide an audio tandem relay device which detects a relay operation of a general relay exchange; performs ATM/STM conversion; establishes an audio one link connection in which an audio signal is not encoded/decoded in a relay station; and produces no loud noises even when the states of a pair of audio tandem relay devices are changed at different times from a normal connection state to a relay connection state.

In order to achieve the above objects, according to the present invention, there is provided an audio tandem relay device for relaying an audio signal inputted from a line to a paired audio tandem relay device via an exchange, comprising: a cell disassembly for disassembling an ATM cell inputted from the line into an encoded audio signal; an audio decoder for decoding the encoded audio signal into the signal; a pseudo audio signal generator for generating a pseudo encoded audio signal by converting the encoded audio signal, the pseudo audio signal having an unchanged data rate from that before the conversion and a transmission rate capable of being handled by the exchange; a first pattern inserter for inserting a first pattern signal into the signal so that the pair audio tandem relay device acknowledges that a current transmission is a relay transmission; a second pattern inserter for inserting a second pattern signal into the signal so that the pair audio tandem relay device acknowledges that its own audio tandem relay device is in a relay exchange state; an audio encoder for encoding an audio signal from the exchange; a transmission rate recoverer for changing the pseudo encoded audio signal from the exchange into an encoded audio signal having an original transmission rate; a cell assembly for assembling an ATM cell from an encoded audio signal to output to the line; a first pattern detector for detecting the first pattern signal included in a signal from the exchange; a second pattern detector for detecting the second pattern signal included in a signal from the exchange; a first comfort noise generator for outputting a comfort noise to the line through the cell assembly upon detection of the first pattern signal; a second comfort noise generator for outputting a comfort noise to the exchange through the second pattern inserter upon detection of the first pattern signal; a first switch for switching its connection from the first pattern inserter to the second pattern inserter upon detection of either the first pattern signal or the second pattern signal to thereby connect the second pattern inserter to the exchange; and a second switch for switching its connection from the audio encoder to the transmission rate recoverer upon detection of the second pattern signal to thereby connect the transmission rate recoverer to the cell assembly.

According to this aspect of the present invention, the relay operation of a pair of audio tandem relay devices connected to an exchange is detected by the first and second pattern detectors thereof, and upon detection of a first pattern signal, the first comfort noise generator outputs a comfort noise to the line through the cell assembly, and the second comfort noise generator outputs a comfort noise to the exchange side through the second pattern inserter. With this arrangement, an audio one link connection is established in which an audio signal is not encoded/decoded during relay. This is effective in preventing loud noises from occurring in a pair of audio tandem relay devices during relay when their states shift from a normal connection state to a relay connection state, following the detection of the relay operation.

In another aspect, there is provided an audio tandem relay device for relaying an audio signal inputted from a line to a paired audio tandem relay device via an exchange, comprising: a cell disassembly for disassembling an ATM cell inputted from the line into an encoded audio signal; an audio decoder for decoding the encoded audio signal into the signal; a pseudo audio signal generator for generating a pseudo encoded audio signal by converting the encoded audio signal, the pseudo audio signal having an unchanged data rate from that before the conversion and a transmission rate capable of being handled by the exchange; a first pattern inserter for inserting a first pattern signal into the signal so that the pair audio tandem relay device acknowledges that a current transmission is a relay transmission; a second pattern inserter for inserting a second pattern signal into the signal so that the pair audio tandem relay device acknowledges that its own audio tandem relay device is in a relay exchange state; an audio encoder for encoding an audio signal from the exchange; a transmission rate recoverer for changing the pseudo encoded audio signal from the exchange into an encoded audio signal having an original transmission rate; a cell assembly for assembling an ATM cell from an encoded audio signal to output to the line; a first pattern detector for detecting the first pattern signal included in a signal from the exchange; a second pattern detector for detecting the second pattern signal included in a signal from the exchange; a second comfort noise generator for outputting a comfort noise to the exchange through the second pattern inserter upon detection of the first pattern signal or during a predetermined period of time after detection of the second pattern signal; a first switch for switching its connection from the first pattern inserter to the second pattern inserter upon detection of either the first pattern signal or the second pattern signal to thereby connect the second pattern inserter to the exchange; and a second switch for switching its connection from the audio encoder to the transmission rate recoverer upon detection of the second pattern signal to thereby connect the transmission rate recoverer to the cell assembly.

According to this aspect of the present invention, the relay operation of a pair of audio tandem relay devices connected to an exchange is detected by the first and second pattern detectors thereof, and the second comfort noise generator outputs a comfort signal to the exchange side through the second pattern inserter upon detection of a first pattern signal and for a predetermined period of time after the detection of a second pattern signal. With this arrangement, an audio one link connection is established in which an audio signal is not encoded/decoded during relay. This is effective in preventing loud noises from occurring in a pair of audio tandem relay devices during relay when their states shift from a normal connection state to a relay connection state, following detection of the relay operation.

In another aspect, a pseudo encoded audio signal is outputted through the second pattern inserter when the state of its own device shifts from the initial state via the first pattern signal detection state to the second pattern signal detection state.

In another aspect, there is provided an audio tandem relay device for relaying an audio signal inputted from a line to a paired audio tandem relay device via an exchange, comprising: a cell disassembly for disassembling an ATM cell inputted from the line into an encoded audio signal; an audio decoder for decoding the encoded audio signal into the signal; a pseudo audio signal generator for generating a pseudo encoded audio signal by converting the encoded audio signal, the pseudo audio signal having an unchanged data rate from that before the conversion and a transmission rate capable of being handled by the exchange; a first pattern inserter for inserting a first pattern signal into the signal so that the pair audio tandem relay device acknowledges that a current transmission is a relay transmission; a second pattern inserter for inserting a second pattern signal into the signal so that the pair audio tandem relay device acknowledges that its own audio tandem relay device is in a relay exchange state; an audio encoder for encoding an audio signal from the exchange; a transmission rate recoverer for changing the pseudo encoded audio signal from the exchange into an encoded audio signal having an original transmission rate; a cell assembly for assembling an ATM cell from an encoded audio signal to output to the line; a first pattern detector for detecting the first pattern signal included in a signal from the exchange; a second pattern detector for detecting the second pattern signal included in a signal from the exchange; a first comfort noise generator for outputting a comfort noise to the line through the cell assembly for a predetermined period of time after establishment of a relay call; a first switch for switching its connection from the first pattern inserter to the second pattern inserter upon detection of either the first pattern signal or the second pattern signal to thereby connect the second pattern inserter to the exchange; and a second switch for switching its connection from the audio encoder to the transmission rate recoverer upon detection of the second pattern signal to thereby connect the transmission rate recoverer to the cell assembly.

According to this aspect of the present invention, the first comfort noise generator outputs a comfort noise to the line through the cell assembly for a predetermined period of time after the establishment of a relay call. With this arrangement, the same advantage as the above can be produced.

In another aspect, the cell assembly stops cell assembly for a predetermined period of time after the establishment of a relay call.

In another aspect, the first comfort noise generator outputs a comfort noise through the audio encoder for a predetermined period of time after the establishment of a relay call, during which period the audio encoder is connected to the cell assembly via the second switch.

In another aspect, there is provided an audio tandem relay device for relaying an audio signal inputted from a line to a paired audio tandem relay device via an exchange, comprising: a cell disassembly for disassembling an ATM cell inputted from the line into an encoded audio signal; an audio decoder for decoding the encoded audio signal into the signal; a pseudo audio signal generator for generating a pseudo encoded audio signal by converting the encoded audio signal, the pseudo audio signal having an unchanged data rate from that before the conversion and a transmission rate capable of being handled by the exchange; a first pattern inserter for inserting a first pattern signal into the signal so that the pair audio tandem relay device acknowledges that a current transmission is a relay transmission; a second pattern inserter for inserting a second pattern signal into the signal so that the pair audio tandem relay device acknowledges that its own audio tandem relay device is in a relay exchange state; an audio encoder for encoding an audio signal from the exchange; a transmission rate recoverer for changing the pseudo encoded audio signal from the exchange into an encoded audio signal having an original transmission rate; a cell assembly for assembling an ATM cell from an encoded audio signal to output to the line; a first pattern detector for detecting the first pattern signal included in a signal from the exchange; a second pattern detector for detecting the second pattern signal included in a signal from the exchange; a first comfort noise generator for outputting a comfort noise to the line through the cell assembly upon detection of the first pattern signal; a first switch for switching its connection from the first pattern inserter to the second pattern inserter to thereby connect the second pattern inserter to the exchange upon detection of the second pattern signal, and during a period of time which lasts from detection of a first pattern signal until detection of a second pattern signal by the pair audio tandem relay device; and a second switch for switching its connection from the audio encoder to the transmission rate recoverer upon detection of the second pattern signal to thereby connect the transmission rate recoverer to the cell assembly.

According to this aspect of the present invention, the first comfort noise generator outputs a comfort noise to the line through the cell assembly upon detection of a first pattern signal; and the first switch switches its connection upon detection of a second pattern signal from the first pattern inserter to the second pattern inserter to thereby connect the latter to the exchange, and is also switched thus to thereby connect the latter to the exchange for a predetermined period of time, i.e., from the detection of a first pattern signal to the detection of a second pattern signal by the paired device.

In another aspect, the cell assembly stops cell assembly.

In another aspect, the first comfort noise generator outputs a comfort noise through the audio encoder.

BRIEF DESCRIPTION OF THE DRAWINGS

The above and other objects, features, and advantages, will become further apparent from the following description of the preferred embodiment taken in conjunction with the accompanying drawings wherein.

DESCRIPTION OF THE PREFERRED EMBODIMENTS

Embodiment 1

Figure 1:
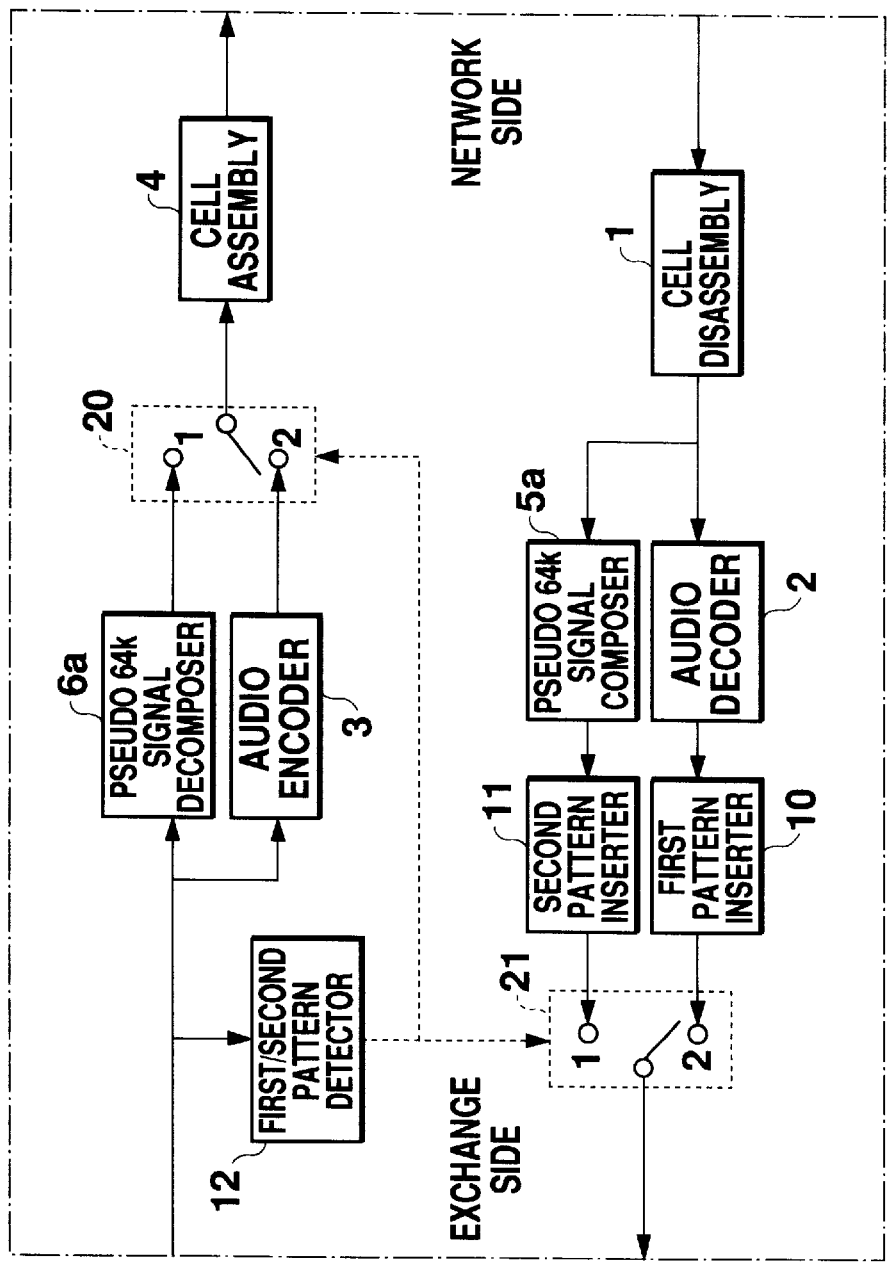
FIG. 1 is a block diagram showing a conventional audio tandem relay device.
Figure 2:
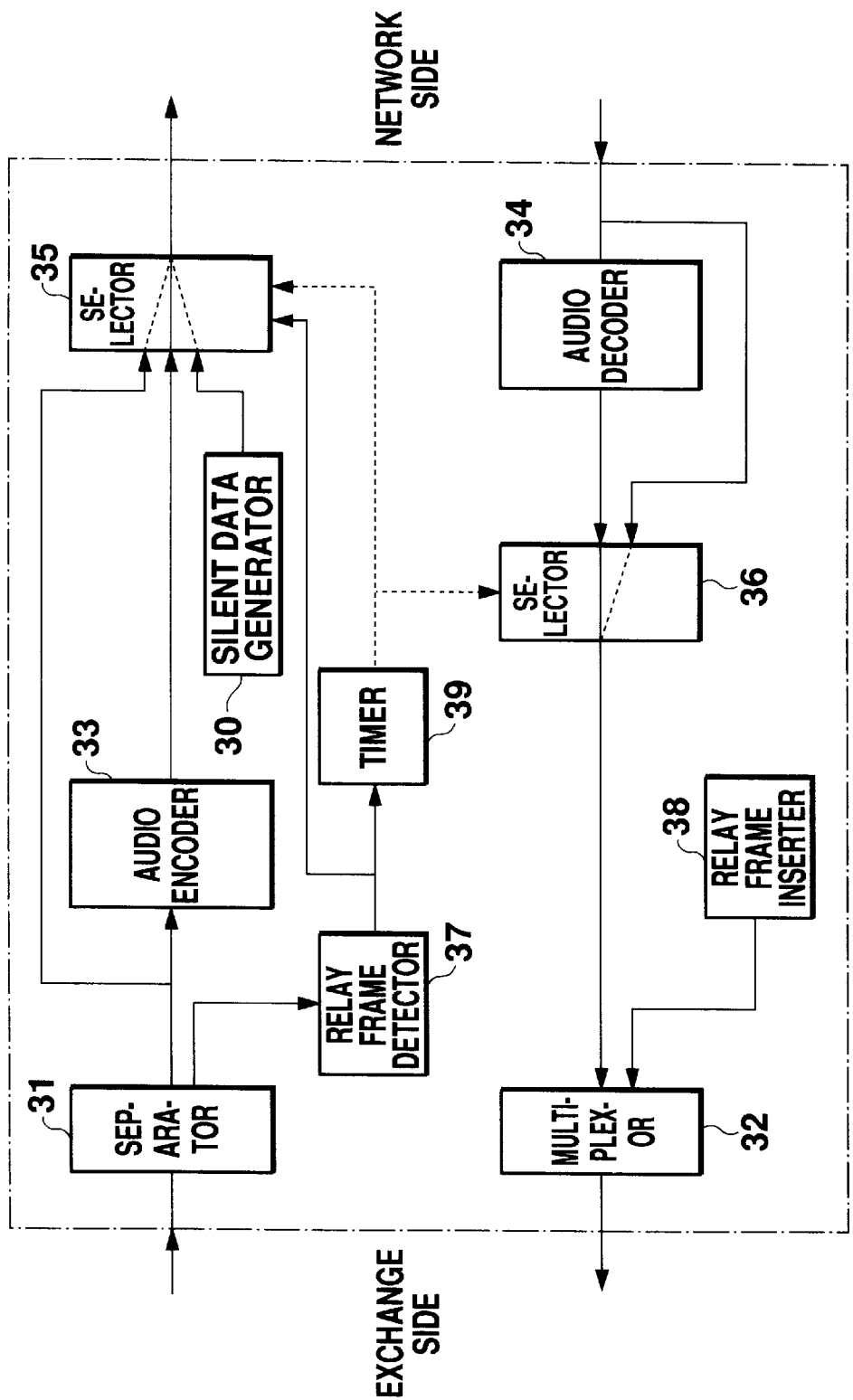
FIG. 2 is a block diagram showing a structure of a conventional audio compression converter.
Figure 3:
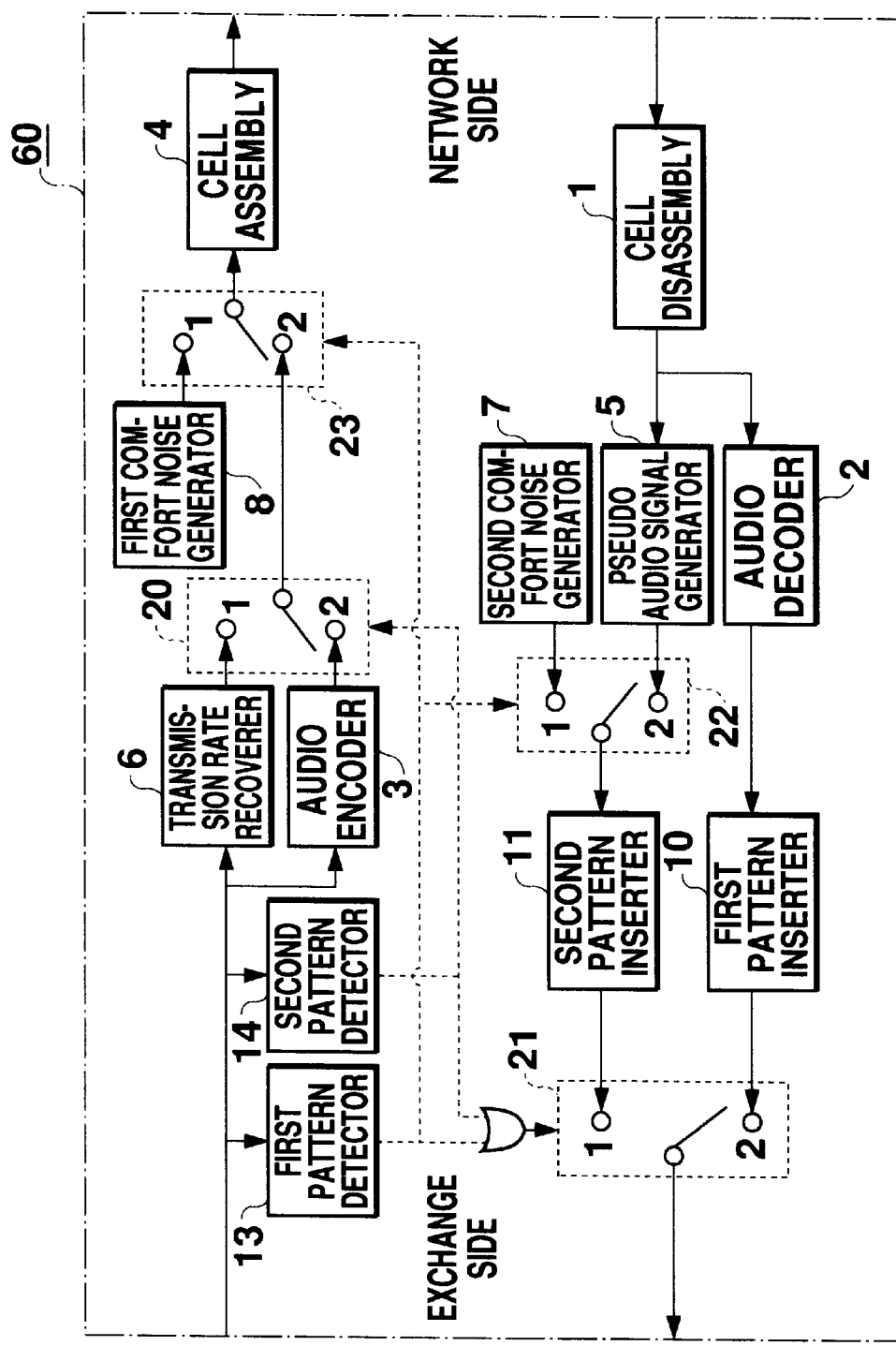
FIG. 3 is a block diagram showing a structure of an audio tandem relay device according to a first preferred embodiment of the present invention.

A preferred embodiment of an audio tandem relay device of the present invention will next be described based on the accompanying drawings. FIG. 3 is a block diagram showing the structure of an audio tandem relay device according to a first embodiment. An audio tandem relay device 60 comprises a cell disassembly 1 for disassembling an ATM cell inputted from a line side into an encoded audio signal; an audio decoder 2 for decoding an encoded audio signal into an audio signal; an audio encoder 3 for encoding an audio signal inputted from an exchange side into an encoded audio signal; a cell assembly 4 for assembling an ATM cell from an inputted encoded audio signal, etc.; a pseudo audio signal generator 5 for generating a pseudo encoded audio signal of 64 kbit/s by converting, without decoding, an encoded audio signal of 32 kbit/s or 16 kbit/s (for instance, for a 32 kbit signal, a 32 kbit dummy signal is added so as to produce a pseudo 64 kbit signal), the pseudo audio signal maintaining the same data rate as that before the conversion and being usable by a relay exchange; and a transmission rate recoverer 6 for converting a pseudo encoded audio signal inputted from an exchange side into an encoded audio signal having the original data rate by deleting, for instance, a 32 kbit dummy signal from a pseudo 64k signal, that is, a pseudo encoded audio signal.

The device 60 further comprises a second comfort noise generator 7 for generating a comfort noise which is not harsh on the ears, including a silent audio signal; a first comfort noise generator 8 for generating a comfort noise which is not harsh on the ears, including a silent audio signal; a first pattern inserter 10 for inserting a first pattern signal so that a pair audio tandem device will acknowledge that the current signal transmission is a relay transmission; a second pattern inserter 11 for inserting a second pattern signal so that a pair audio tandem device will acknowledge that its own device is in a relay exchange state after detection of a first pattern signal; a first pattern detector 13 for detecting a first pattern signal inserted by a paired audio tandem relay device; a second pattern detector 14 for detecting a second pattern signal inserted by a paired audio tandem relay device; a second switch 20 for switching its connection so as to select and output a signal from either the audio encoder 3 or the transmission rate recoverer 6; a first switch 21 for switching its connection so as to select and output a signal from either the first pattern inserter 10 or the second pattern inserter 11; a switch 22 for switching its connection so as to select and output a signal from either the second comfort noise generator 7 or the pseudo audio signal generator 5; and a switch 23 for switching the connection so as to select and output a signal from either the first comfort noise generator 8 or the second switch 20.

Figure 4:
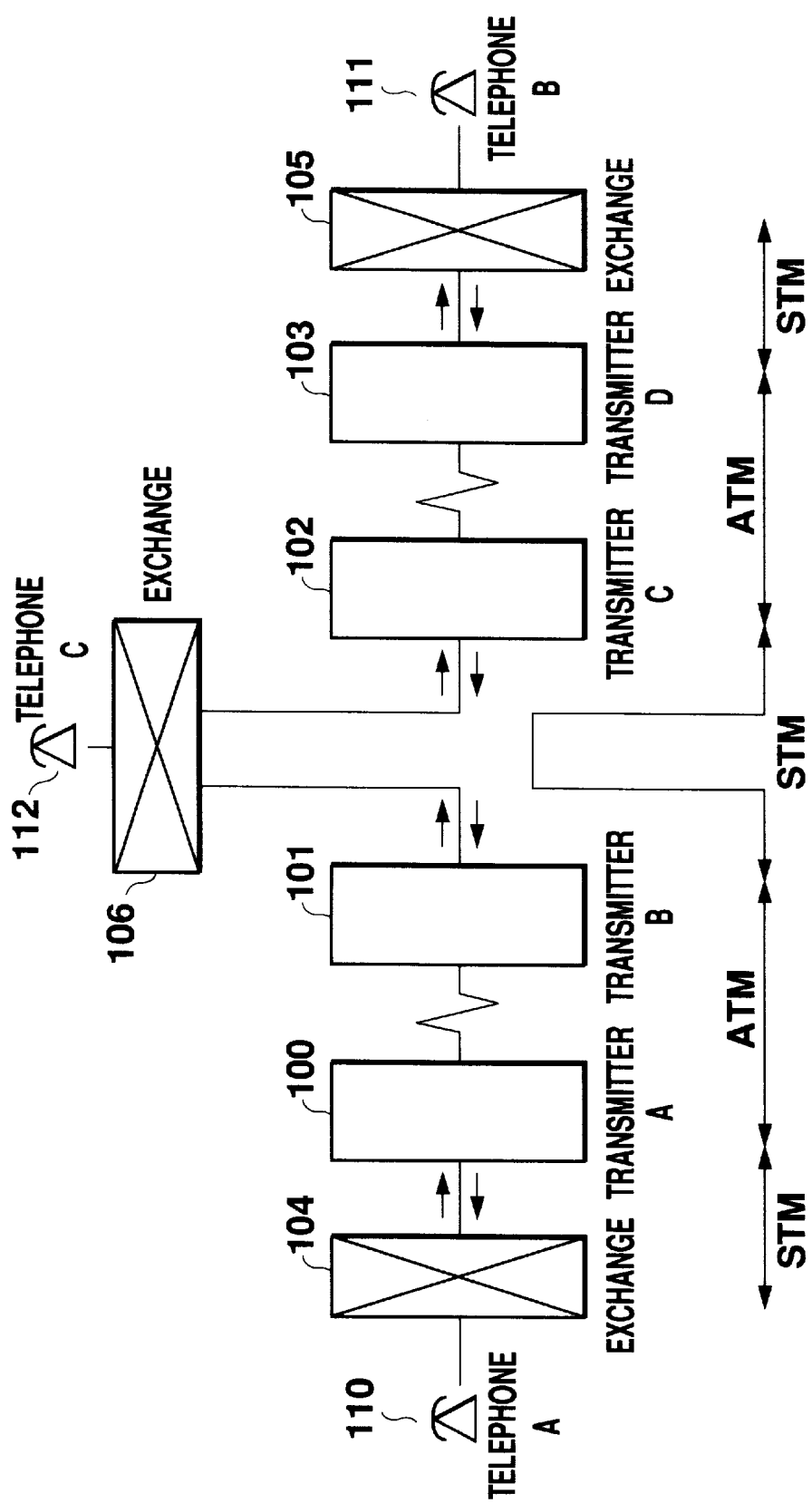
FIG. 4 is a diagram showing a conventional network structure, and that to which an audio tandem relay device of the present invention is applied.

FIG. 4 shows a conventional network structure, and that to which an audio tandem relay device of the present invention is applied. In this drawing, each of the transmitters 100 to 103, having a plurality of channels, includes an audio tandem relay device of the prior art or the present invention provided for every channel. Telephones 110, 111, 112 are connected to exchanges 104, 105, 106, respectively. Transmitters B 101 and C 102 may be separate transmitters or the same transmitter.

In operation, referring to FIG. 3, the first and second switches 21, 20, and switches 22, 23 are initially connected at the contact points 2. In normal call connection, that is, when the telephone A 110 calls the telephone C 112 in FIG. 4, first and second pattern detectors 13, 14 detect neither a first nor a second pattern signal because an audio signal then inputted from an exchange side does not include either of them. As a result, first and second switches 21, 20 and switches 22, 23 remain in the initial connection states. The audio signal supplied from the exchange side and then inputted into the audio encoder 3 is encoded into an encoded audio signal and further transmitted via the second switch 20 and the switch 23 to the cell assembly 4. The cell assembly 4 assembles a cell from the signal supplied and outputs the cell into the line side.

Also, a cell inputted from the line side is disassembled into an encoded audio signal by the cell disassembly 1. The resulting signal supplied to the audio decoder 2 is decoded into an audio signal, which is then supplied to the first pattern inserter 10 to be given a first pattern signal before being outputted via the first switch 21 to the exchange side.

Figure 5:
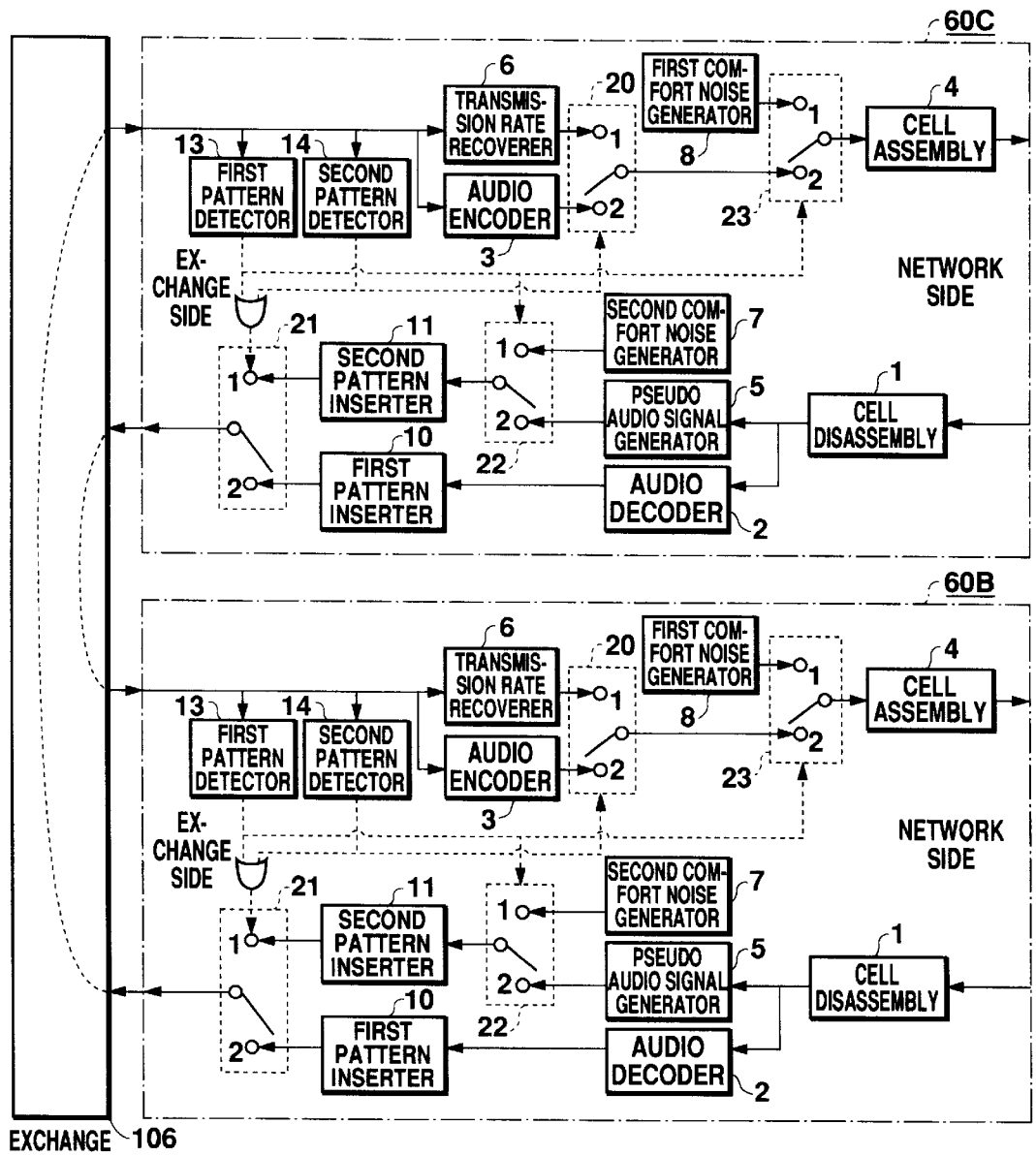
FIG. 5 is a diagram showing an audio tandem relay device according to the first preferred embodiment of the present invention, connected to an exchange for relaying.

In the case of relay connection via a relay exchange, that is, when the telephone A 110 calls the telephone B 111 in FIG. 4, an audio tandem relay device is connected to an exchange which is further connected on the other side to another audio tandem relay device. These two audio tandem relay devices make a pair in relay transmission, and each will be hereinafter referred to as a paired audio tandem relay device or a paired device. FIG. 5 shows the structure of a pair of audio tandem relay devices which are relay-connected via an exchange, in which identical or equivalent components to those in FIGS. 3 and 4 are given the same reference numerals. In this drawing, devices 60B, 60C are two audio tandem relay devices connected to each other via an exchange 106. They are supplied with cells from respective preceding devices on the line side. In each device, a cell supplied is disassembled by the cell disassembly 1 into an encoded audio signal. The encoded audio signal subsequently inputted into the audio decoder 2 is decoded into an audio signal, which is then inputted into the first pattern inserter 10 to be given a first pattern signal before being outputted via the first switch 21 to the exchange 106.

It should be noted that if no cell is received, the cell disassembly 1 outputs either a silent encoded audio signal or an encoded noise signal, etc., or the audio decoder 2 outputs either a silent audio signal or a comfort noise signal, etc., so that callers will not hear uncomfortable or unpleasant noises. Such a signal is supplied to the first pattern inserter 10 and given a first pattern signal before being outputted via the first switch 21 to the exchange 106.

In relaying, an audio signal including a first pattern signal transmitted via the exchange 106 is inputted into an audio tandem relay device, and particularly into a first pattern detector 13 thereof for detection of a first pattern signal. In FIG. 5, both of the audio tandem relay devices 60B, 60C receive audio signals including first pattern signals from the exchange 106 during relay and detect a first pattern signal in the signal received. It should be noted here that such detection will not be performed exactly simultaneously in both devices 60B, 60C. To be specific, first pattern signal detection in the device 60C may be made earlier than that in the device 60B, or vice versa.

It will be assumed in this explanation that the detection in the device 60C is made earlier than that in the other. Upon the detection, the first switch 21 and the switches 22, 23 in the device 60C are switched so as to be connected at the contact points 1. As a result, a silent encoded audio signal from the first comfort noise generator 8 is supplied via the switch 23 to the cell assembly 4, so that the cell assembly 4 puts the signal supplied into a cell for outputting to the line side.

At this stage, an audio signal including a first pattern signal is continuously supplied from the device 60B to the device 60C. This inputted signal which is then supplied to the audio encoder 3 is subsequently outputted from the switch 20. However, it cannot pass through the switch 23 as the switch 23 is connected at the contact point 1. Thus, a silent encoded audio signal from the first comfort noise generator 8 is supplied to the cell assembly 4, as described above, to be put into a cell for outputting to the line side. With this arrangement, a caller on the device 60C side in this network will hear silence.

Following the above switching due to the detection of a first pattern signal, the second comfort noise generator 7 outputs a silent audio signal in the device 60C, which is transmitted via the switch 22 to the second pattern inserter 11. After the inserter 11 inserts a second pattern signal into the signal received, the silent audio signal including a second pattern signal is outputted via the switch 21 to the exchange 106.

This silent audio signal is transmitted via the exchange 106 to the audio tandem relay device 60B. In the device 60B, the signal is inputted into the audio encoder 3, as well as to the transmission rate recoverer 6, and encoded into an silent encoded audio signal. The resultant signal is supplied via the second switch 20 and the switch 23 to the cell assembly 4. The cell assembly 4 assembles a cell from the signal supplied and outputs it to the line side. With this arrangement, a caller on the device 60B side in this network will also hear silence.

As described above, callers in this network will hear a comfortable noise, including silence, instead of loud noises, even when the device 60C has already detected a first pattern signal while the device 60B has not yet detected either a first or second pattern signal.

At the next stage, a second pattern signal is detected by a second pattern detector 14 in the device 60B. That is, detection of a second pattern signal, instead of a first pattern signal, is made in the audio tandem relay device 60B. Upon this detection, the first and second switches 21, 20 are switched to the contact points 1. The switches 22, 23 remain connected at the contact points 2. Then, the silent audio signal inputted into the transmission rate recoverer 6 is able to pass through the second switch 20 after being changed into a silent encoded audio signal, and then the switch 23. When this signal reaches the cell assembly 4, the cell assembly 4 assembles a cell from the signal received and outputs the cell to the line side. With this arrangement, a caller on the audio tandem relay device 60B side in this network will also hear silence at this stage.

Incidentally, an encoded audio signal outputted from the cell disassembly 1 into the pseudo audio signal generator 5 is changed into a pseudo audio signal in the latter, which then proceeds via the switch 22 to the second pattern inserter 11 to be given a second pattern signal. After the aforementioned switching due to the detection of a second pattern signal, the pseudo audio signal including a second pattern signal is then able to pass through the first switch 21 to be outputted to the exchange 106.

This signal is supplied to the device 60C and inputted into the audio encoder 3, as well as the transmission rate recoverer 6. An output from the encoder 3, however, is unable to reach the cell assembly 4 as the switch 23 is connected at the contact point 1. An output from the recoverer 6 is also unable to proceed due to the switch 20 which is connected at the contact point 2. Therefore, a silent encoded audio signal from the first comfort noise generator 8 remains being supplied to the cell assembly 4 to be outputted in the form of a cell to the line side. With the above, a caller on the device 60C side in this network will also hear silence, not loud noises, at this stage.

As described above, callers on the both sides of the devices 60B, 60C in this network will hear comfortable noises, including silence, instead of loud noises, even if the two devices are in different states, i.e., the device 60C is in a first pattern signal detection state and the device 60B is in a second pattern signal detection state.

At the following stage, a second pattern signal is detected in the device 60C, simultaneously with which a first pattern signal detection is stopped, so that a second pattern signal in the pseudo 64$k$ signal supplied is detected. Upon this detection, the second switch 20 is switched to the contact point 1, while the switches 22, 23 are switched to the contact points 2. The first switch 21 remains connected at the contact point 1. With the switches in this state, the pseudo 64$k$ signal inputted into the transmission rate recoverer 6 is able to pass through the switch 20, after being converted into an encoded audio signal, and then pass through the switch 23. When the signal reaches the cell assembly 4, the cell assembly 4 assembles a cell from the signal supplied and outputs a cell to the line side.

Also, in the device 60C, a pseudo 64$k$ signal, originated from an encoded audio signal supplied by the cell disassembly 1, is outputted from the pseudo audio signal generator 5. This signal is then able to pass through the switch 22 and is supplied to the second pattern inserter 11. After insertion of a second pattern signal, the signal is outputted via the first switch 21 to the exchange 106.

This pseudo 64$k$ signal is transmitted via the exchange 106 to the device 60B. In the device 60B, where the second and the first switches 20, 21 have already been connected at the contact points 1 and the switches 22, 23 connected at contact points 2, the pseudo 64$k$ signal supplied is processed similarly to the above.

With all the arrangements above, an audio one-link connection has been established, in which an audio signal is neither encoded nor decoded in a relay station, and callers will hear normal sounds of preferable audio quality.

Moreover, switching can be performed without having callers hear loud noises during a period from the establishment of a relay connection to a relay exchange 106, to that of an audio one-link connection.

Embodiment 2

Another preferred embodiment of an audio tandem relay device of the present invention will next be described based on the accompanying drawing.

Figure 6:
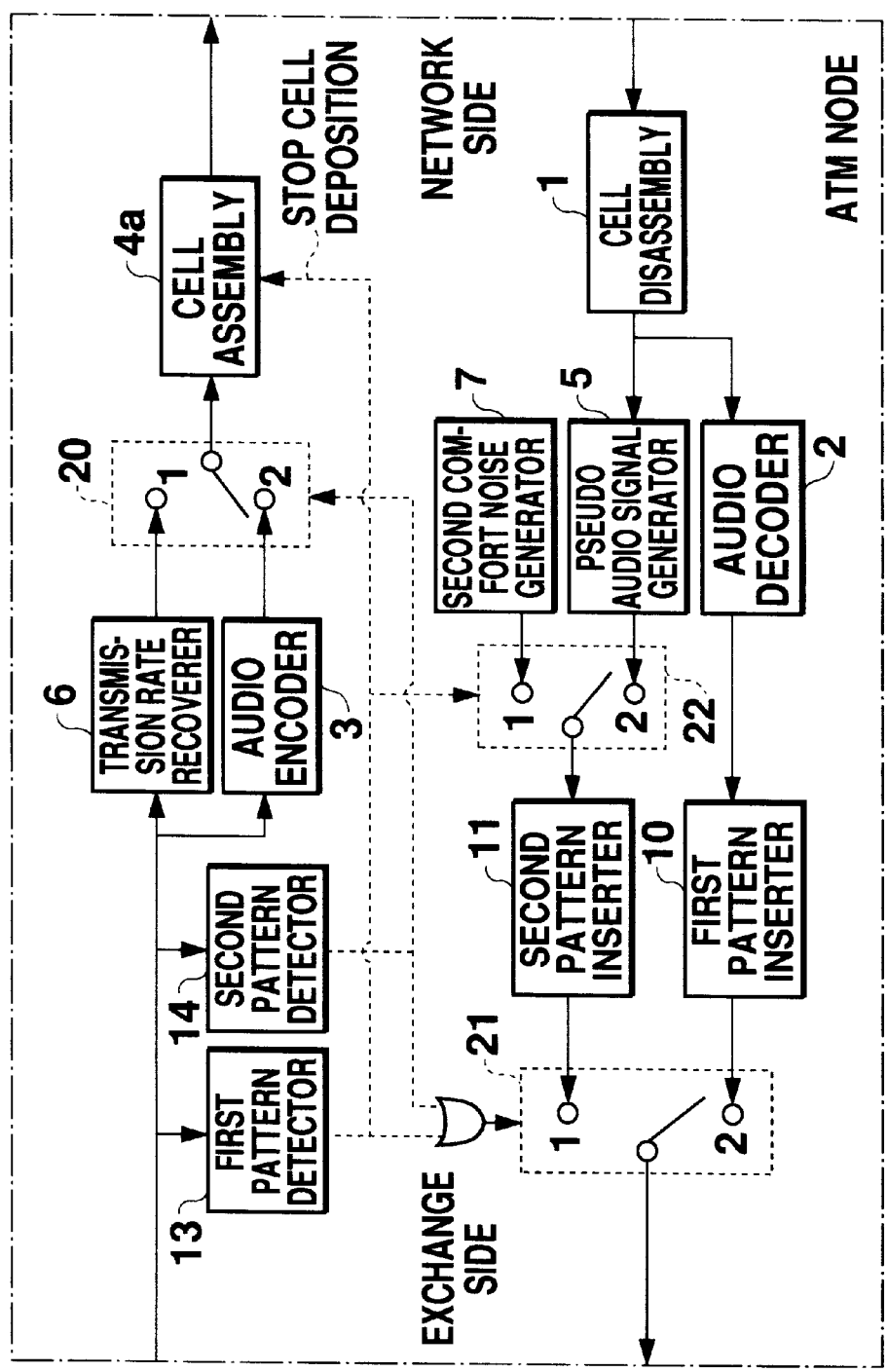
FIG. 6 is a block diagram showing a structure of an audio tandem relay device according to a second preferred embodiment of the present invention.

FIG. 6 is a block diagram showing the structure of an audio tandem relay device according to a second embodiment, in which components identical or equivalent to those in FIG. 3 are given the same reference numerals. This structure comprises a cell assembly 4a for assembling an ATM cell out of an inputted encoded audio signal, etc. This cell assembly 4a is capable of receiving a first pattern signal detection signal from the first pattern detector 13 as a cell assembly stop signal and stopping cell assembly and transmission accordingly.

In operation, this embodiment realizes the functions of the first comfort noise generator 8 and the switch 23 of the first embodiment by utilizing the cell assembly stop function of the cell assembly 4a. With this cell assembly stop function, cell assembly and transmission are stopped so that no cell will be transmitted to the paired device. This structure is also provided with a function for outputting either a silent audio signal or a comfort noise signal to an exchange side so that a caller will not hear uncomfortable or unpleasant sound when no cell is received. With the above, the same advantage as that in the first embodiment can be obtained.

Embodiment 3

In the following, another preferred embodiment of an audio tandem relay device of the present invention will be described based on the accompanying drawing.

Figure 7:
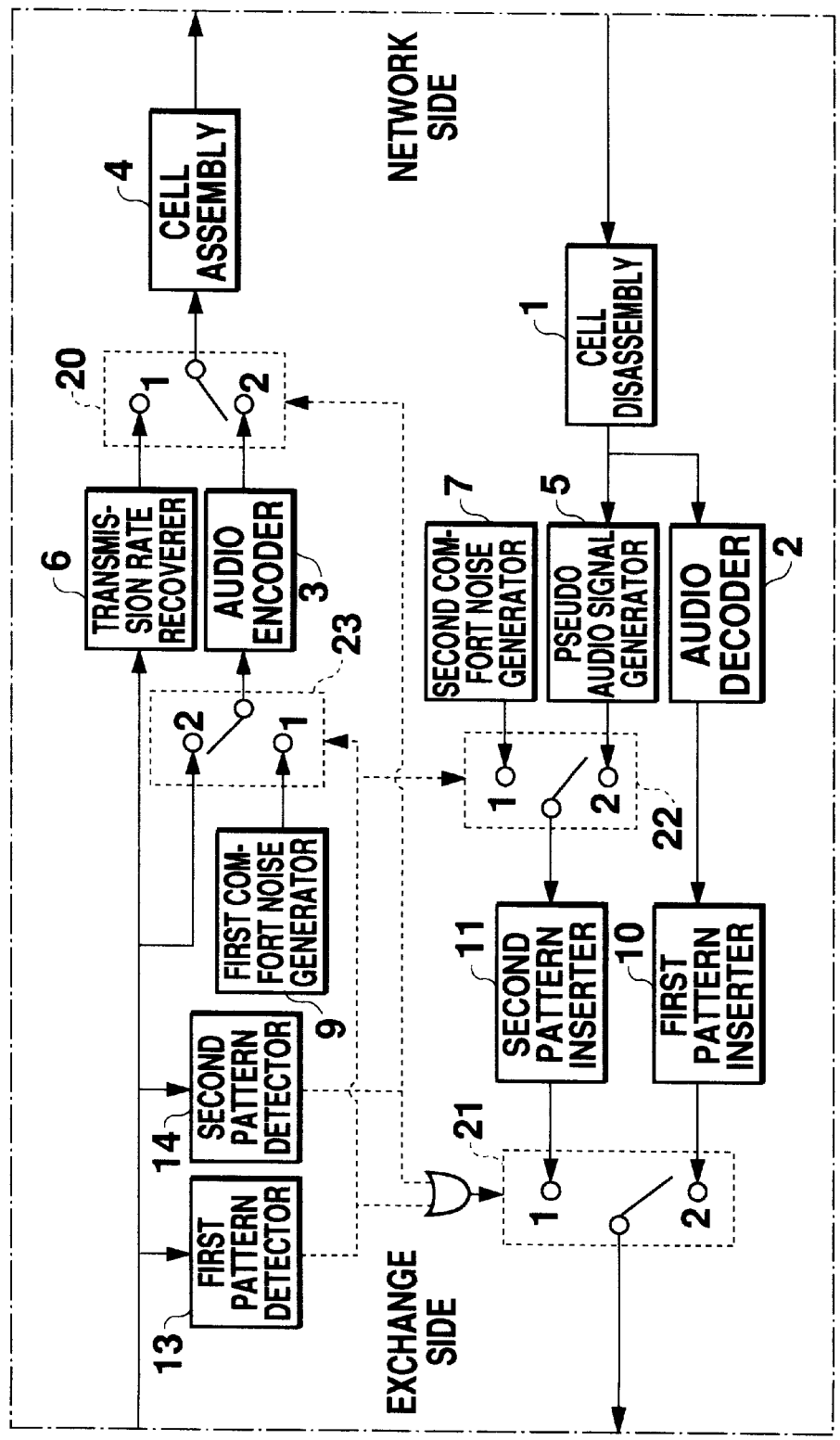
FIG. 7 is a block diagram showing a structure of an audio tandem relay device according to a third preferred embodiment of the present invention.

FIG. 7 is a block diagram showing a structure of an audio tandem relay device according to a third embodiment, in which components identical or equivalent to those in FIG. 3 are given the same reference numerals. This structure comprises a first comfort noise generator 9 for generating a comfort noise, including a silent audio signal.

In operation, this embodiment realizes the functions of the first comfort noise generator 8 and the switch 23 of the first embodiment by using the first comfort noise generator 9 and the switch 23.

In the first embodiment, after the switch 23 is switched to be connected at the contact point 1 upon detection of a first pattern signal, a silent encoded audio signal from the first comfort noise generator 8 is supplied to the cell assembly 4, where the signal is put into a cell for outputting. In the third embodiment, on the other hand, a silent audio signal from the first comfort noise generator 9 is supplied to the audio encoder 3 to be encoded into a silent encoded audio signal. This signal is then transmitted via the second switch 20 to the cell assembly 4, where the signal is put into a cell for outputting. With this arrangement, the same advantage as that in the first embodiment can be obtained.

Embodiment 4

In the following, another preferred embodiment of an audio tandem relay device of the present invention will be described based on the accompanying drawing.

Figure 8:
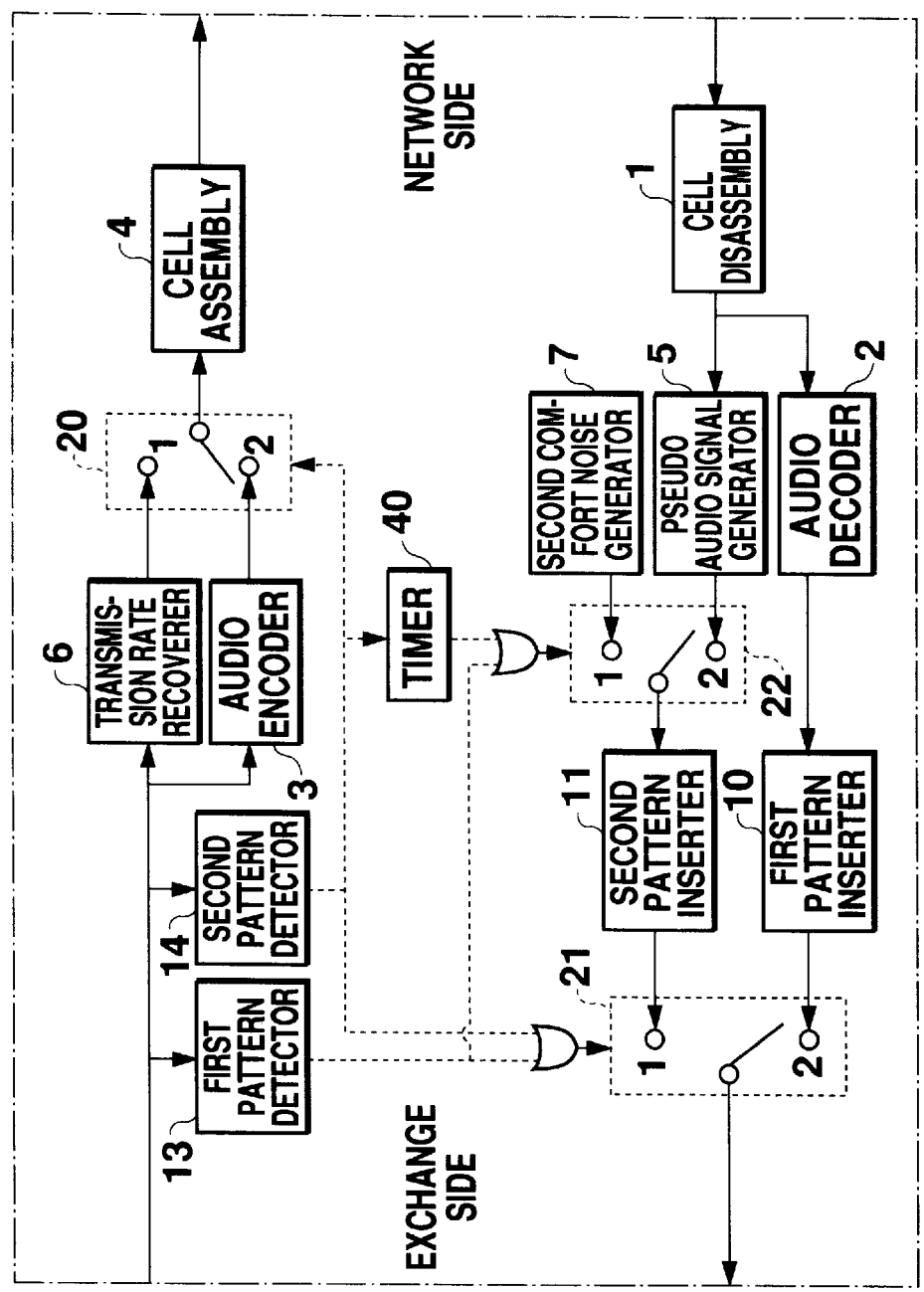
FIG. 8 is a block diagram showing a structure of an audio tandem relay device according to a fourth preferred embodiment of the present invention.

FIG. 8 is a block diagram showing a structure of an audio tandem relay device according to a fourth embodiment, in which components identical or equivalent to those in FIG. 3 are given the same reference numerals. This structure comprises a timer 40.

As mentioned above, in the case that the device 60B in a second pattern signal detection state outputs a pseudo 64k signal including a second pattern signal into the device 60C in a first pattern signal detection state, the pseudo 64k signal received by the device 60C and then inputted into the audio encoder 3 thereof is encoded into an encoded audio signal which may cause loud noises. When the encoded audio signal is put into a cell by the cell assembly 4 and outputted, the caller may hear loud noises.

In the first embodiment, occurrence of these noises is prevented by using the first comfort noise generator 8 and the switch 23 in the device 60C, i.e., a device which assembles and outputs a cell to a line side. In the fourth embodiment, on the other side, the prevention is effected in a device which disassembles a cell and outputs an audio or pseudo 64k signal to an exchange side, namely, the device 60B.

Remember that in the first embodiment, the switch 22 has been kept connected to the contact point 1 only during the detection of a first pattern signal. In the fourth embodiment, the switch 22 is kept thus connected during the detection of a first pattern signal or for a predetermined period of time gauged by the timer 40 after the detection of a second pattern signal. The predetermined period of time is from the start of outputting a signal including a second pattern signal after the detection of a second pattern signal, to well beyond the completion of changing the state of the switches in the paired device after the detection of a second pattern signal thereby. With this structure, the same advantage of that in the first embodiment can be obtained.

Embodiment 5

In the following, another preferred embodiment of an audio tandem relay device of the present invention will be described based on the accompanying drawing.

Figure 9:
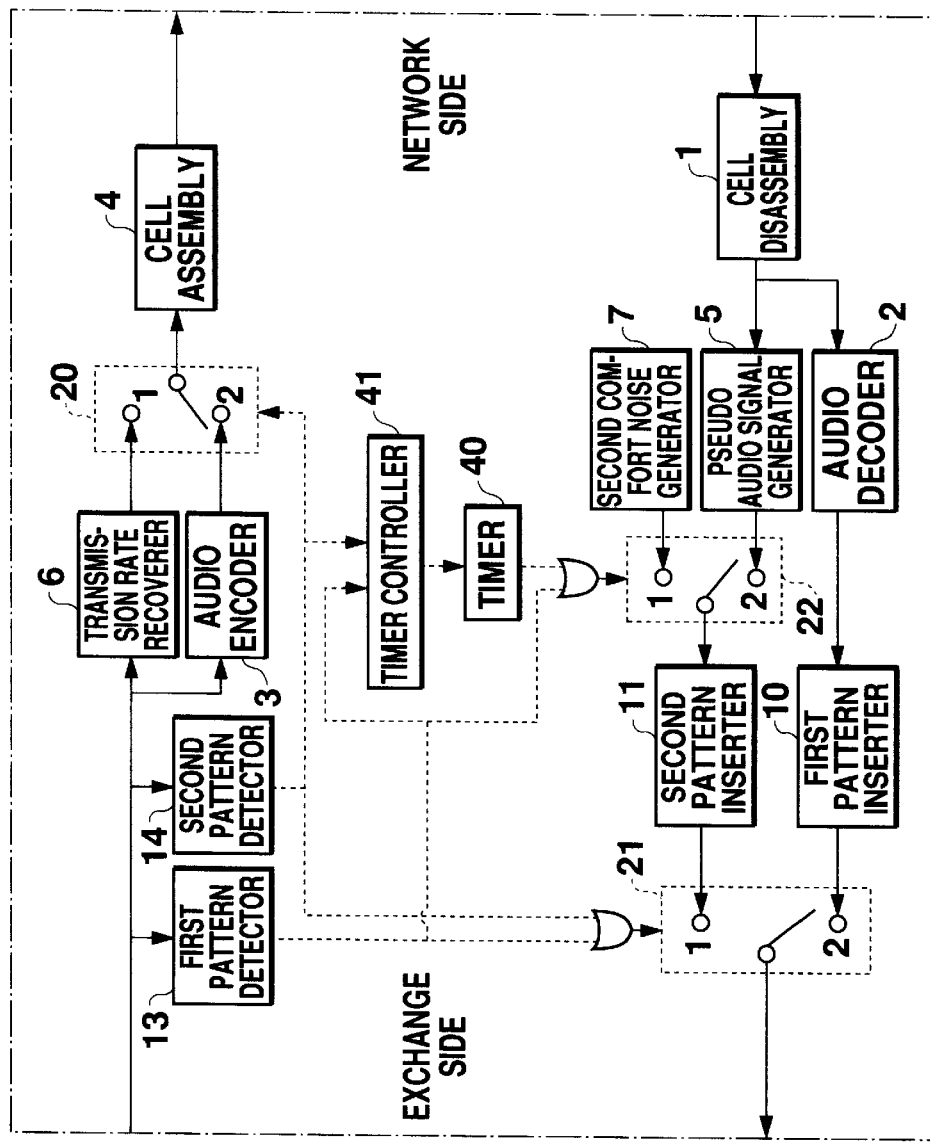
FIG. 9 is a block diagram showing a structure of an audio tandem relay device according Lo a fifth preferred embodiment of the present invention.

FIG. 9 is a block diagram showing a structure of an audio tandem relay device according to a fifth embodiment, in which components identical or equivalent to those in FIG. 3 are given the same reference numerals. This structure comprises a timer controller 41.

In operation, Embodiment 5 causes the timer 40 of the fourth embodiment to be operated only when it is necessary. Specifically, the switch 22 must be controlled by the timer 40 when the state of its own device shifts directly from the initial state to the second pattern signal detection signal, but not when such shifting is carried out via the first pattern signal detection signal. The timer 40 is activated upon detection of a second pattern signal to control the switch 22 in the former shifting, but does not need to be activated in the latter shifting.

The state of one audio tandem relay device shifts from the initial state directly to the second pattern signal detection state when its paired device detects a first pattern signal. In such a case, there is a moment when the concerned device is in the second pattern signal detection state, while its paired device is in the first pattern signal detection state. In such an event, to prevent the occurrence of loud noises, the concerned device must keep supplying a silent audio signal including a second pattern signal to its paired device until the paired device is in a second pattern signal detection state, and then a pseudo 64 signal including a second pattern signal after the paired device detected a second pattern signal. In the above, the timer 40 in the concerned device needs to be activated upon the detection of a second pattern signal.

On the contrary, the state of one device shifts from the initial state via the first pattern signal detection state to the second pattern signal detection state when that device detects a first pattern signal earlier than its paired device that. In this case, the paired device is in the second pattern signal detection state by the time the concerned device becomes in the second pattern signal detection state. Thus, it is unnecessary for the concerned device to send a silent signal to its paired device and for the timer 40 to be activated.

In view of the above, the timer controller 41 does not activate the timer 40, despite the detection of a second pattern signal, when the state of its own device shifts from the initial state via the first signal detection state to the second signal detection signal. On the contrary, it must activate the timer 40 upon detection of a second pattern signal when the state of its own device shifts from the initial state directly to the second pattern signal detection state. With this arrangement, a period of time when callers will hear silence or a comfort noise is reduced by the maximum, while the same advantage as that in the first embodiment can be obtained.

Embodiment 6

In the following, another preferred embodiment of an audio tandem relay device of the present invention will be described based on the accompanying drawing.

Figure 10:
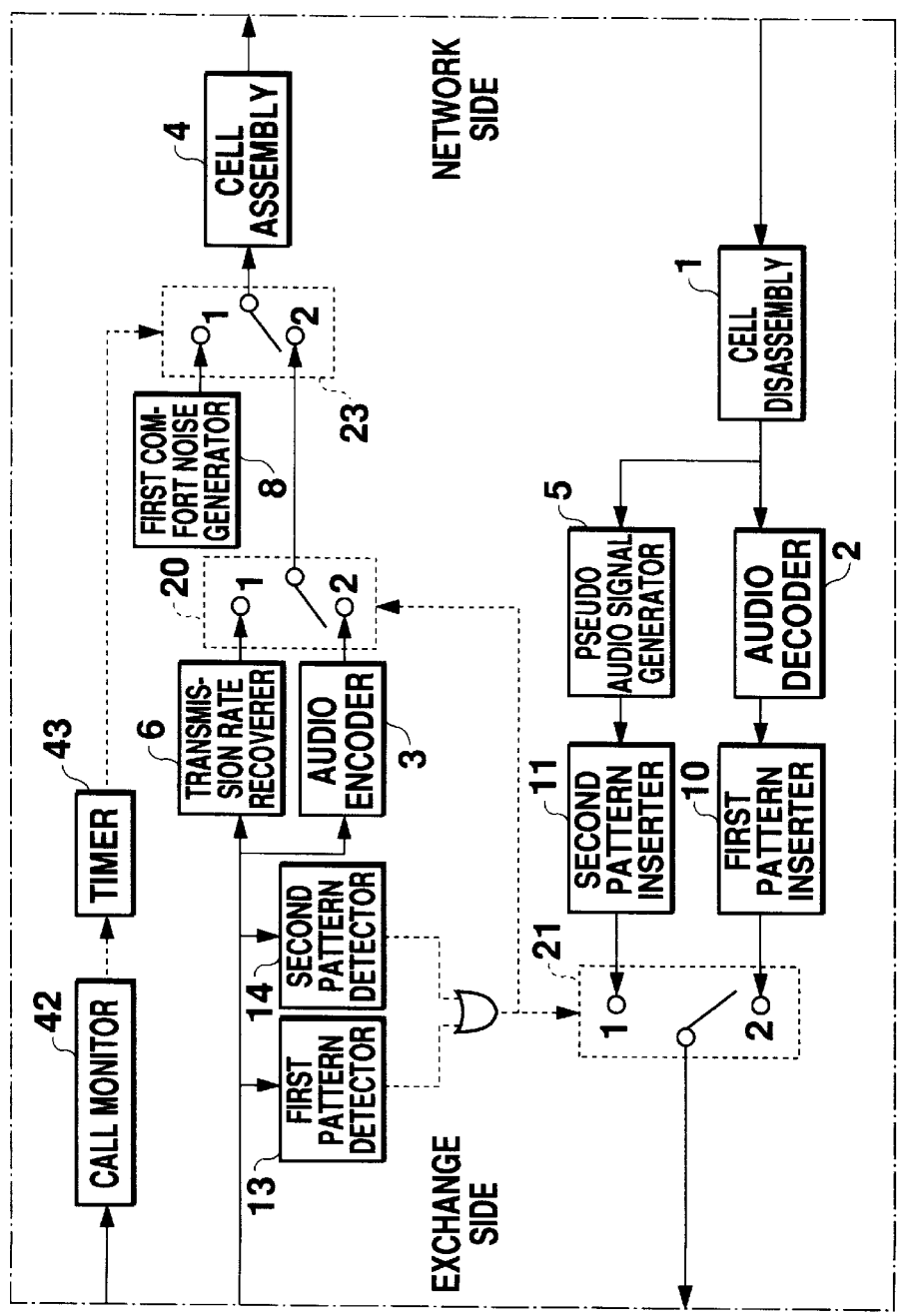
FIG. 10 is a block diagram showing a structure of an audio tandem relay device according to a sixth preferred embodiment of the present invention.

FIG. 10 is a block diagram showing a structure of an audio tandem relay device according to a sixth embodiment, in which components identical or equivalent to those in FIG. 3 are given the same reference numerals. This structure comprises a call monitor 42 and a timer 43.

For establishment of a relay connection and of an audio one link connection in which an audio signal is not encoded/decoded in a device in relay connection with an exchange, the states of the switches of relevant devices must be changed accordingly. Due to this change, loud noises may occur for a predetermined period of time after the establishment of a relay call. In an audio tandem relay device of this embodiment, the call monitor 42 monitors establishment of a relay call, and the switch 23 is rendered connected at the contact point 1 for a predetermined period of time gauged by the timer 43 after the establishment. During this period, a silent encoded audio signal from the first comfort noise generator 8 is supplied to cell assembly 4, so that the cell assembly 4 assembles a cell from the signal supplied to output. With this arrangement, occurrence of loud noises can be prevented, while the same advantage as that in the first embodiment can be obtained.

Embodiment 7

In the following, another preferred embodiment of an audio tandem relay device of the present invention will be described based on the accompanying drawing.

Figure 11:
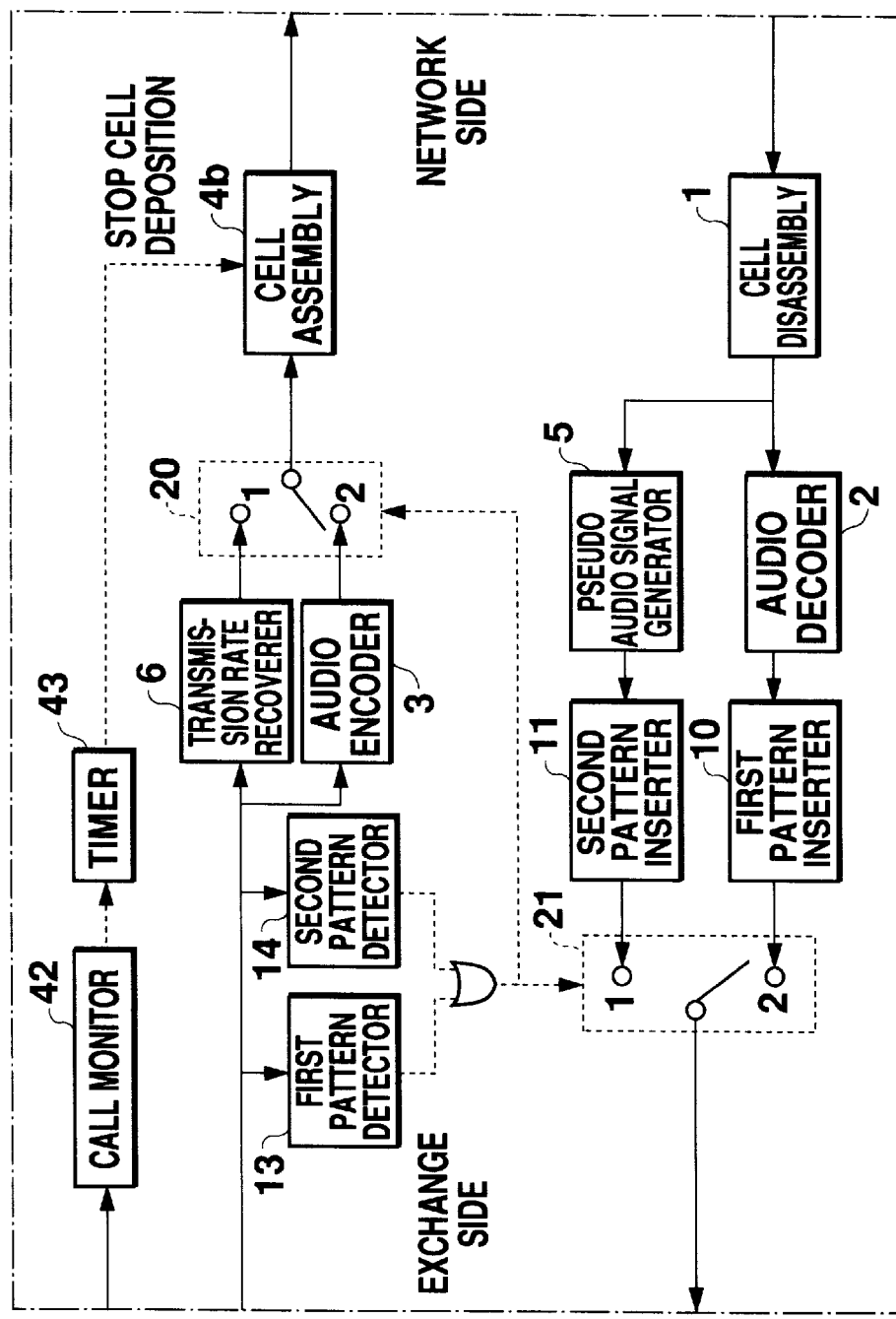
FIG. 11 is a block diagram showing a structure of an audio tandem relay device according to a seventh preferred embodiment of the present invention.

FIG. 11 is a block diagram showing a structure of an audio tandem relay device according to a seventh embodiment, in which components identical or equivalent to those in FIG. 3 are given the same reference numerals. This structure comprises a cell assembly 4b for assembling and outputting an ATM cell from an inputted encoded audio signal, and so on. This cell assembly 4b is capable of receiving a signal which indicates the on-state of the timer 43 outputted therefrom as a cell assembly stop signal and stopping cell assembly and transmission accordingly.

In operation, this embodiment realizes the functions of the first comfort noise generator 8 and the switch 23 of the sixth embodiment by utilizing the cell assembly stop function of the cell assembly 4b. With this cell assembly stop function, cell assembly and transmission are stopped so that no cell will be transmitted to the paired device. This structure is also provided with a function for outputting either a silent audio signal or a comfort noise signal to the exchange side so that a caller will not hear uncomfortable or unpleasant sounds when no cell is received. With the above, the same advantage as that in the first embodiment can be obtained.

Embodiment 8

In the following, another preferred embodiment of an audio tandem relay device of the present invention will be described based on the accompanying drawing.

Figure 12:
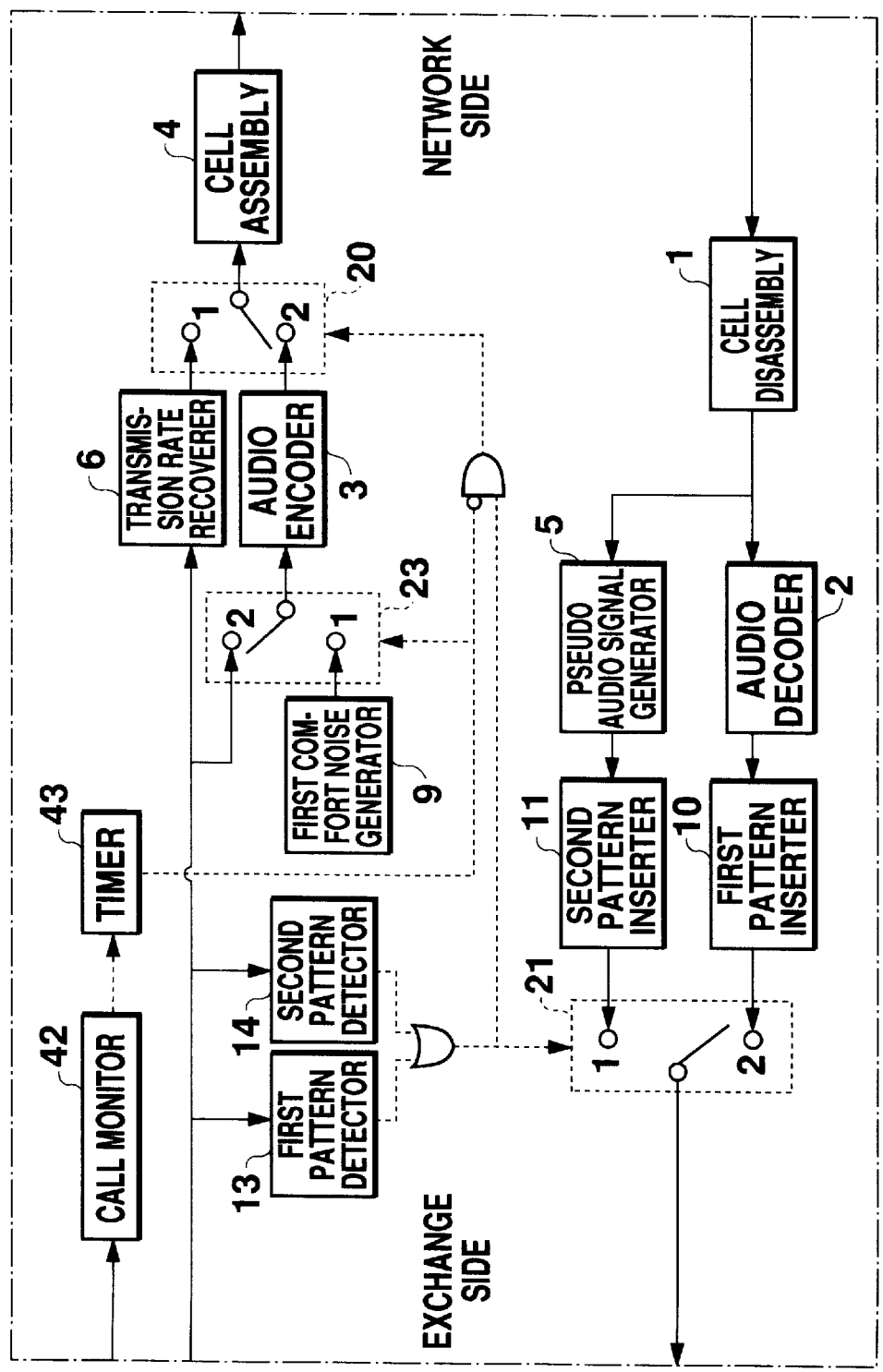
FIG. 12 is a block diagram showing a structure of an audio tandem relay device according to an eighth preferred embodiment of the present invention.

FIG. 12 is a block diagram showing a structure of an audio tandem relay device according to an eighth embodiment, in which components identical or equivalent to those in FIG. 3 have the same reference numerals. This structure comprises a first comfort noise generator 9 for generating a comfort noise, including a silent audio signal.

In operation, this embodiment realizes the functions of the first comfort noise generator 8 and the switch 23 of the sixth embodiment by using the first comfort noise generator 9 and the switch 23.

In the sixth embodiment, the call monitor 42 outputs a timer activation signal to activate the timer 43 upon establishment of a call connection. In response to this signal, the timer 43 outputs a significant signal only for a predetermined period of time, so that the switch 23 is connected at the contact point 1 in response to the significant signal. As a result, a silent encoded audio signal from the first comfort noise generator 8 is outputted into a cell assembly 4, where the signal is put into a cell for outputting.

In the eighth embodiment, on the other hand, the switch 23 is switched to the contact point 1 in response to a significant signal, so that a silent audio signal from the first comfort noise generator 9 is supplied to the audio encoder 3. After being encoded into a silent encoded audio signal in the audio encoder 3, the signal is supplied to the cell assembly 4 via the second switch 20, and outputted in the form of a cell. Note that the second switch 20 remains connected at the contact point 2 while the significant signal is being outputted. With this arrangement, callers will hear a comfort noise, including silence, instead of loud noises.

Embodiment 9

In the following, another preferred embodiment of an audio tandem relay device of the present invention will be described based on the accompanying drawing.

Figure 13:
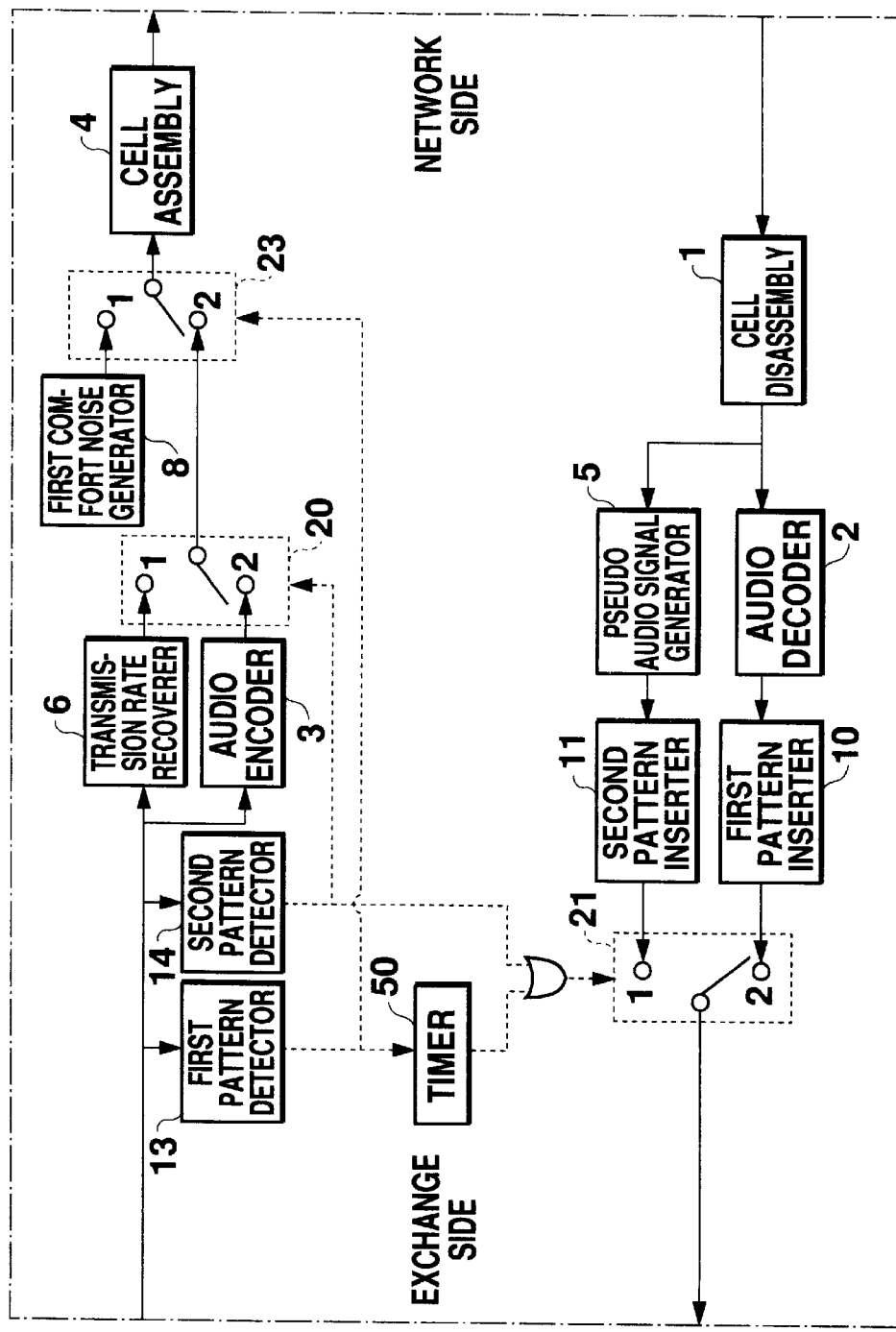
FIG. 13 is a block diagram showing a structure of an audio tandem relay device according to a ninth preferred embodiment of the present invention.

FIG. 13 is a block diagram showing a structure of an audio tandem relay device according to a ninth embodiment, in which components identical or equivalent to those in FIG. 3 are given the same reference numerals. This structure comprises a timer 50 for being activated a predetermined period of time after the detection of a first pattern signal so as to output a significant signal for a predetermined period of time from its activation.

In operation, a difference in timing for detecting a first pattern signal between a pair of audio tandem relay devices after the establishment of relay call connection via an exchange has already been described. In the following description, an audio tandem device with earlier detection will be referred to as an audio tandem relay device C, and the other as an audio tandem relay device B.

Upon the detection, the switch 23 in the device C is switched to the contact point 1, so that a silent encoded audio signal from the first comfort noise generator 8 is outputted via the switch 23 into the cell assembly 4 to be put into a cell for outputting. When a predetermined period of time has passed after the detection, the timer 50 is activated to output a significant signal. The timing at which the first switch 21 is switched to the contact point 1, i.e., the timing of stopping the first pattern signal from the device C is delayed. Note that the predetermined period of time is from the detection of a first pattern signal to well past the first pattern signal detection in the device B.

At this stage, the device B, where a first pattern signal is not yet detected, is supplied with an audio signal including a first pattern signal. The signal received by the device B and then inputted into the audio encoder 3 thereof is encoded into an encoded audio signal and transmitted via the second switch 20 and the switch 23 to the cell assembly 4. The cell assembly 4 puts the signal received into a cell to output.

At the next stage, where a first pattern signal is detected in the device B, the switch 23 is switched to the contact point 1. As a result, a silent encoded audio signal from a first comfort noise generator 8 is supplied via the switch 23 to the cell assembly 4 to be outputted in the form of a cell. This is identical processing to that performed in the device C at the previous stage, which also remains at this stage in the device C.

In the device C, upon issuance of a significant signal, the first switch 21 is switched to the contact point 1, so that a pseudo 64k signal including a second pattern signal is outputted to the device B.

Subsequently, a significant signal is also outputted in the device B and the identical processing to the above, including outputting a pseudo 64k signal into the device C, follows.

At the next stage, when a pseudo 64k signal including a second pattern signal is supplied to the device B and that pattern is detected, the second switch 20 is switched to the contact point 1, while the switch 23 is switched to the contact point 2. The first switch 21 remains connected at the contact point 1. During this stage, the device C remains outputting a pseudo 64k signal including a second pattern signal to the device B. The pseudo 64k signal supplied to the device B is inputted into the transmission rate recoverer 6, as well as to the audio encoder 3, to be changed into an encoded audio signal. The resulting signal is then able to pass through the second switch 20 and the switch 23 to proceed to the cell assembly 4, so that the cell assembly puts the signal received into a cell to be outputted.

Subsequently, a second pattern signal is also detected in the device C. After this detection, identical processing to that in the device B will be performed.

As described above, in this embodiment, when a pair of audio tandem relay devices detect a first pattern signal with a time difference after a relay call has been established, the state of a device of the pair with earlier detection will remain unchanged until the other detects the first pattern. As a result, the states of both relay devices will shift uniformly from the initial state, to the first pattern signal detection state, to the second pattern signal detection state. With the above, the same advantage as that in the first embodiment can be obtained.

Embodiment 10

In the following, another preferred embodiment of an audio tandem relay device of the present invention will be described based on the accompanying drawing.

Figure 14:
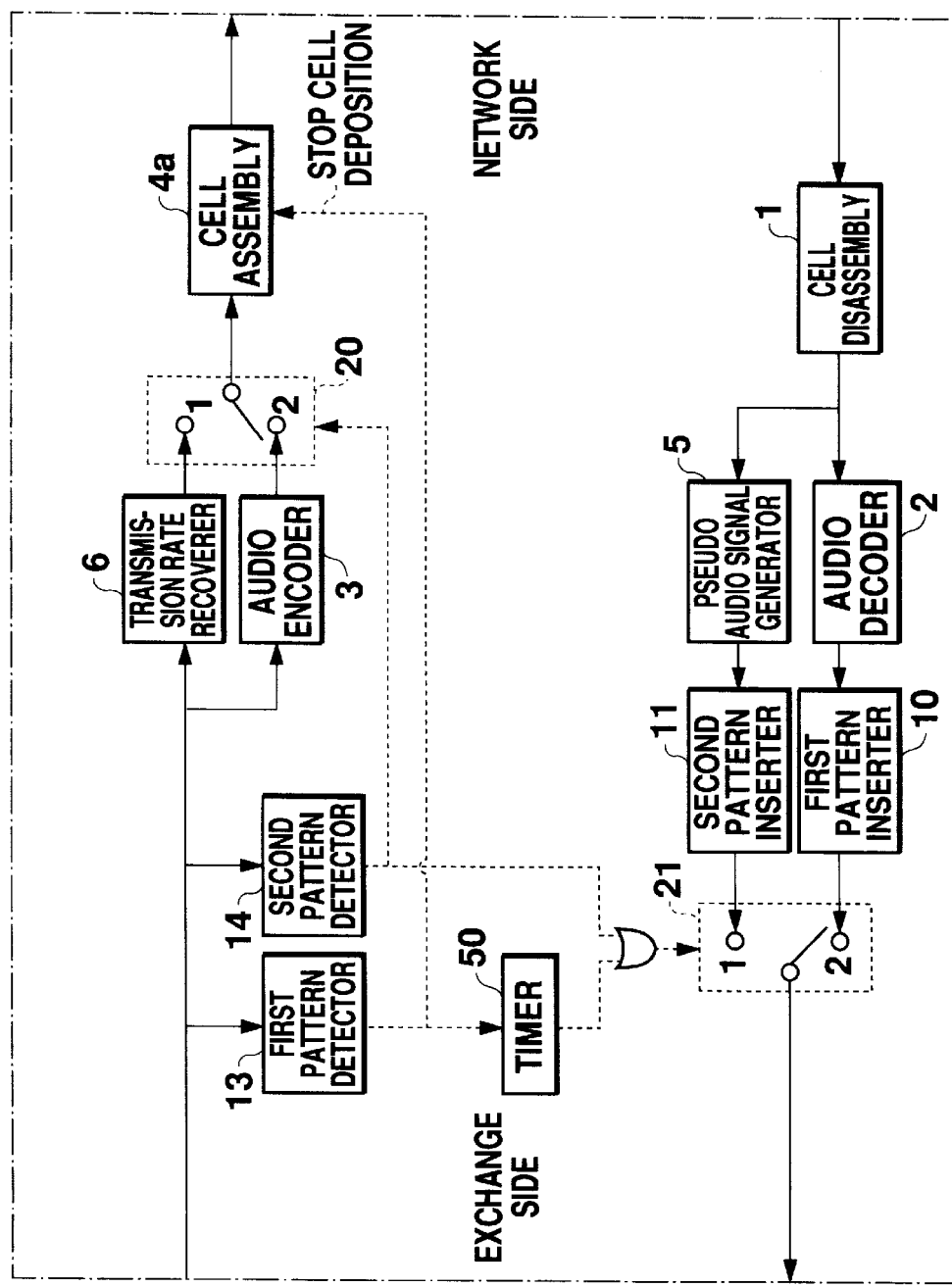
FIG. 14 is a block diagram showing a structure of an audio tandem relay device according to a tenth preferred embodiment of the present invention.

FIG. 14 is a block diagram showing a structure of an audio tandem relay device according to a tenth embodiment, in which components identical or equivalent to those in FIG. 3 are given the same reference numerals. This structure comprises a cell assembly 4a for assembling an ATM cell out of an inputted encoded audio signal, etc. The cell assembly 4a is capable of receiving a first pattern signal detection signal from the first pattern detector 13 as a cell assembly stop signal and stopping cell assembly and transmission according to this signal.

In operation, this embodiment realizes the functions of the first comfort noise generator 8 and the switch 23 of the ninth embodiment by utilizing the cell assembly stop function of the cell assembly 4a. With this cell assembly stop function, cell assembly and transmission are stopped so that no cell will be transmitted to a paired device. This structure is also provided with a function for outputting either a silent audio signal or a comfort noise signal to an exchange side so that a caller will not hear uncomfortable or unpleasant sounds when no cell is received. With the above, the same advantage as in the first embodiment can be obtained.

Embodiment 11

In the following, another preferred embodiment of an audio tandem relay device of the present invention will be described based on the accompanying drawing.

Figure 15:
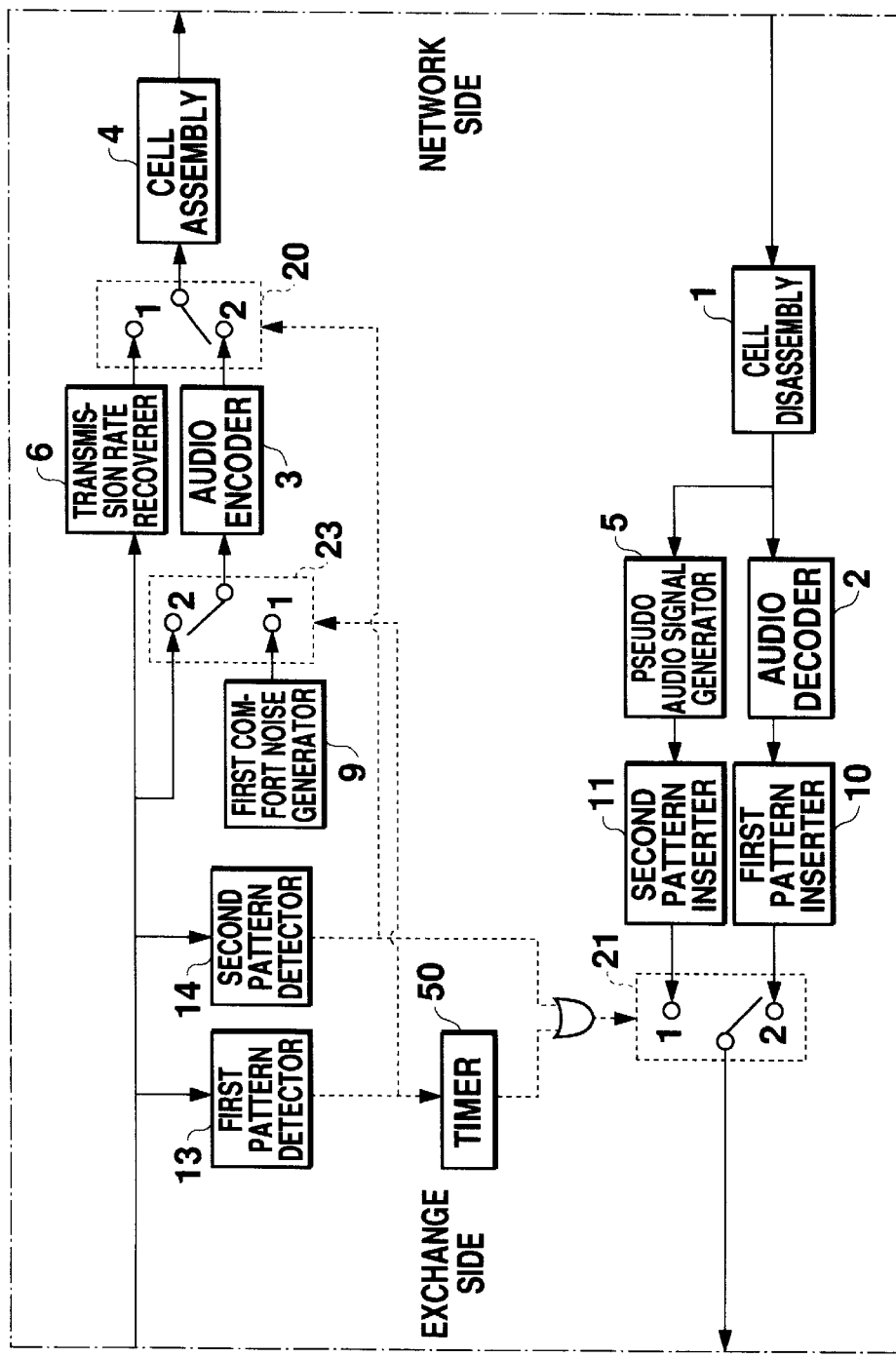
FIG. 15 is a block diagram showing a structure of an audio tandem relay device according to an eleventh preferred embodiment of the present invention.

FIG. 15 is a block diagram showing a structure of an audio tandem relay device according to the third embodiment, in which components identical or equivalent to those in FIG. 3 are given the same reference numerals. This structure comprises a first comfort noise generator 9 for generating a comfort noise, including a silent audio signal.

In operation, this embodiment realizes the functions of the first comfort noise generator 8 and the switch 23 of the ninth embodiment by using a first comfort noise generator 9 and the switch 23.

In the ninth embodiment, after the switch 23 is switched to be connected at the contact point 1 upon detection of a first pattern signal, a silent encoded audio signal from the first comfort noise generator 8 is supplied to the cell assembly 4, where the signal is then put into a cell for outputting. In the eleventh embodiment, on the other hand, a silent audio signal from the first comfort noise generator 9 is supplied to the audio encoder 3 to be encoded into a silent encoded audio signal. The resulting signal proceeds via the second switch 20 to the cell assembly 4, where the signal is then put into a cell for outputting. With this arrangement, callers will hear silence, but not loud noises.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An audio tandem relay device for relaying an audio signal inputted from a line as ATM cells to a second audio tandem relay device via an exchange, comprising:

a cell disassembly for disassembling a received ATM cells inputted from the line into an encoded audio signal;

an audio decoder for decoding the encoded audio signal into the audio signal;

a pseudo audio signal generator for generating a pseudo encoded audio signal by converting the encoded audio signal, the pseudo audio signal having a data rate unchanged from that of the encoded audio signal and a transmission rate capable of being handled by the exchange;

a first pattern inserter for inserting a first pattern signal into the audio signal so that the second audio tandem relay device may identify that the current transmission is a relay transmission;

a second pattern inserter for inserting a second pattern signal into the pseudo encoded audio signal so that the second audio tandem relay device may identify that it is in a relay exchange state;

an audio encoder for encoding an audio signal received from the exchange;

a transmission rate recoverer for changing the pseudo encoded audio signal when received from the exchange into an encoded audio signal having an original transmission rate;

a cell assembly for assembling an ATM cell from the encoded audio signal to output to the line;

a first pattern detector for detecting the first pattern signal included in a signal from the exchange;

a second pattern detector for detecting the second pattern signal included in a signal from the exchange;

a first comfort noise generator for outputting a comfort noise to the line through the cell assembly upon detection of the first pattern signal;

a second comfort noise generator for outputting a comfort noise to the exchange through the second pattern inserter upon detection of the first pattern signal;

a first switch for switching its connection from the first pattern inserter to the second pattern inserter upon detection of either the first pattern signal or the second pattern signal to thereby connect the second pattern inserter to the exchange; and a second switch for switching its connection from the audio encoder to the transmission rate recoverer upon detection of the second pattern signal to thereby connect the transmission rate recoverer to the cell assembly.

2. An audio tandem relay device for relaying an audio signal inputted from a line as ATM cells to a second audio tandem relay device via an exchange, comprising:

a cell disassembly for disassembling a received ATM cells inputted from the line into an encoded audio signal;

an audio decoder for decoding the encoded audio signal into the audio signal;

a pseudo audio signal generator for generating a pseudo encoded audio signal by converting the encoded audio signal, the pseudo audio signal having a data rate unchanged from that of the encoded audio signal and a transmission rate capable of being handled by the exchange;

a first pattern inserter for inserting a first pattern signal into the audio signal so that the second audio tandem relay device may identify that the current transmission is a relay transmission;

a second pattern inserter for inserting a second pattern signal into the pseudo encoded audio signal so that the second audio tandem relay device may identify that it is in a relay exchange state;

an audio encoder for encoding an audio signal received from the exchange;

a transmission rate recoverer for changing the pseudo encoded audio signal when received from the exchange into an encoded audio signal having an original transmission rate;

a cell assembly for assembling an ATM cell from an encoded audio signal to output to the line;

a first pattern detector for detecting the first pattern signal included in a signal from the exchange;

a second pattern detector for detecting the second pattern signal included in a signal from the exchange;

a comfort noise generator for outputting a comfort noise to the exchange through the second pattern inserter upon detection of the first pattern signal or during a predetermined period of time after detection of the second pattern signal;

a first switch for switching its connection from the first pattern inserter to the second pattern inserter upon detection of either the first pattern signal or the second pattern signal to thereby connect the second pattern inserter to the exchange; and a second switch for switching its connection from the audio encoder to the transmission rate recoverer upon detection of the second pattern signal to thereby connect the transmission rate recoverer to the cell assembly.

3. The audio tandem relay device as defined in claim 2, wherein the pseudo encoded audio signal is outputted through the second pattern inserter when the state of its own audio tandem relay device shifts from an initial state via a first pattern signal detection state to a second pattern signal detection state.

4. An audio tandem relay device for relaying an audio signal inputted from a line as ATM cells to a second audio tandem relay device via an exchange, comprising:

a cell disassembly for disassembling a received ATM cells inputted from the line into an encoded audio signal;

an audio decoder for decoding the encoded audio signal into the audio signal;

a pseudo audio signal generator for generating a pseudo encoded audio signal by converting the encoded audio signal, the pseudo audio signal having a data rate unchanged from that of the encoded audio signal and a transmission rate capable of being handled by the exchange;

a first pattern inserter for inserting a first pattern signal into the audio signal so that the second audio tandem relay device may identify that the current transmission is a relay transmission;

a second pattern inserter for inserting a second pattern signal into the pseudo encoded audio signal so that the second audio tandem relay device may identify that it is in a relay exchange state;

an audio encoder for encoding an audio signal received from the exchange;

a transmission rate recoverer for changing the pseudo encoded audio signal when received from the exchange into an encoded audio signal having an original transmission rate;

a cell assembly for assembling an ATM cell from an encoded audio signal to output to the line;

a cell assembly for assembling an ATM cell from the encoded audio signal to output to the line;

a first pattern detector for detecting the first pattern signal included in a signal from the exchange;

a second pattern detector for detecting the second pattern signal included in a signal from the exchange;

a comfort noise generator for outputting a comfort noise to the line through the cell assembly for a predetermined period of time after establishment of a relay call;

a first switch for switching its connection from the first pattern inserter to the second pattern inserter upon detection of either the first pattern signal or the second pattern signal to thereby connect the second pattern inserter to the exchange; and a second switch for switching its connection from the audio encoder to the transmission rate recoverer upon detection of the second pattern signal to thereby connect the transmission rate recoverer to the cell assembly.

5. The audio tandem relay as defined in claim 4, wherein, the cell assembly stops cell assembly for a predetermined period of time after the establishment of a relay transmission.

6. The audio tandem relay as defined in claim 4, wherein, the comfort noise generator outputs a comfort noise through the audio encoder for a predetermined period of time after the establishment of a relay transmission, during which the audio encoder is connected to the cell assembly via the second switch.

7. An audio tandem relay device for relaying an audio signal inputted from a line as ATM cells to a second audio tandem relay device via an exchange, comprising:

a cell disassembly for disassembling a received ATM cells inputted from the line into an encoded audio signal;

an audio decoder for decoding the encoded audio signal into the audio signal;

a pseudo audio signal generator for generating a pseudo encoded audio signal by converting the encoded audio signal, the pseudo audio signal having a data rate unchanged from that of the encoded audio signal and a transmission rate capable of being handled by the exchange;

a first pattern inserter for inserting a first pattern signal into the audio signal so that the second audio tandem relay device may identify that the current transmission is a relay transmission;

a second pattern inserter for inserting a second pattern signal into the pseudo encoded audio signal so that the second audio tandem relay device may identify that it is in a relay exchange state;

an audio encoder for encoding an audio signal received from the exchange;

a transmission rate recoverer for changing the pseudo encoded audio signal when received from the exchange into an encoded audio signal having an original transmission rate;

a cell assembly for assembling an ATM cell from the encoded audio signal to output to the line;

a first pattern detector for detecting the first pattern signal included in a signal from the exchange;

a second pattern detector for detecting the second pattern signal included in a signal from the exchange;

a comfort noise generator for outputting a comfort noise to the to the line through the cell assembly upon detection of the first pattern signal;

a first switch for switching its connection from the first pattern inserter to the second pattern inserter to thereby connect the second pattern inserter to the exchange upon detection of the second pattern signal, and during a period of time which lasts from detection of a first pattern signal until detection of a second pattern signal by the pair audio tandem relay device; and a second switch for switching its connection from the audio encoder to the transmission rate recoverer upon detection of the second pattern signal to thereby connect the transmission rate recoverer to the cell assembly.

8. The audio tandem relay device as defined in claim 1, wherein
the first pattern detector has the cell assembly stop cell assembly to thereby output the comfort noise to the line through the cell assembly.

9. The audio tandem relay device as defined in claim 1, wherein
the first comfort noise generator outputs a comfort noise through the audio encoder.

10. The audio tandem relay device as defined in claim 7, wherein
the first pattern detector has the cell assembly stop cell assembly to thereby output the comfort noise to the line through the cell assembly.

11. The audio tandem relay device as defined in claim 7, wherein
the first comfort noise generator outputs a comfort noise through the audio encoder.

12. An audio tandem relay for selectively relaying an audio signal composed of ATM cells that may be pre-encoded from a line to a second audio tandem relay comprising:

a cell disassembly for disassembling each received ATM cell inputted from said line to develop an encoded audio signal;

an audio decoder for decoding the encoded audio signal into the audio signal, said audio decoder being selectively enabled;

an audio encoder for encoding an audio signal received from the exchange, said audio encoder being selectively enabled;

a cell assembly for assembling an ATM cell inputted from the encoded audio signal to output to the line;

a pattern inserter for inserting at least one pattern signal into the audio signal, the pattern signal identifying whether the current transmission is a relay transmission;

a first comfort noise generator for outputting a comfort noise to the line through the cell assembly during switching between relay transmission and enabling of said audio decoder and encoder; and a second comfort noise generator for outputting a comfort noise to the exchange during switching between relay transmission and enabling of said audio decoder and encoder.

13. The audio tandem relay device of claim 12 further comprising:

a pattern detector for detecting the first pattern signal included in a signal from said exchange;

said first comfort noise generator being responsive to detection of said first pattern signal by said first pattern detector.

14. The audio tandem relay device of claim 13 wherein said pattern inserter further inserts a second pattern signal into the pseudo encoded signal;

said device further comprising a second pattern detector detecting the second pattern signal included in a signal from the exchange;

said first comfort noise generator outputting the comfort noise during a predetermined time after detection of said second pattern signal.

15. The audio tandem relay device of claim 13 wherein said first comfort noise generator outputs the comfort noise for a predetermined time after establishment of a relay transmission.

* * * * *